United States Patent
Kawamura

(10) Patent No.: US 9,863,545 B2
(45) Date of Patent: Jan. 9, 2018

(54) HOSE COUPLING DEVICE, MOP SUCTION DEVICE, ELECTRIC VACUUM CLEANER, AND BALL VALVE

(71) Applicant: KAWAMURA KEIICHI, Aichi (JP)

(72) Inventor: Keiichi Kawamura, Aichi (JP)

(*) Notice: Subject to any disclaimer, the term of this patent is extended or adjusted under 35 U.S.C. 154(b) by 373 days.

(21) Appl. No.: 14/413,783

(22) PCT Filed: Jul. 11, 2013

(86) PCT No.: PCT/JP2013/068967
§ 371 (c)(1),
(2) Date: Jan. 9, 2015

(87) PCT Pub. No.: WO2014/010668
PCT Pub. Date: Jan. 16, 2014

(65) Prior Publication Data
US 2015/0201818 A1 Jul. 23, 2015

(30) Foreign Application Priority Data
Jul. 11, 2012 (JP) .................................. 2012-155195

(51) Int. Cl.
*F16K 11/08* (2006.01)
*F16K 11/087* (2006.01)
(Continued)

(52) U.S. Cl.
CPC ........ *F16K 11/0876* (2013.01); *A47L 7/0052* (2013.01); *A47L 7/0057* (2013.01);
(Continued)

(58) Field of Classification Search
CPC .............. F16K 11/087; F16K 11/0873; F16K 11/0876; Y10T 137/86863; Y10T 137/86871
(Continued)

(56) References Cited

U.S. PATENT DOCUMENTS 3,674,052 A * 7/1972 Hartman ............... F16K 5/0605
251/315.16
3,684,241 A * 8/1972 Hartmann ............. F16K 5/0605
137/625.47
(Continued)

FOREIGN PATENT DOCUMENTS

JP 2-6867 U 1/1990
JP 05-71550 U 9/1993
(Continued)

OTHER PUBLICATIONS

Official Communication issued in International Patent Application No. PCT/JP2013/068967, dated Oct. 15, 2013.

*Primary Examiner* — Eric Keasel
(74) *Attorney, Agent, or Firm* — Keating & Bennett, LLP

(57) ABSTRACT

[Object] To significantly increased the convenience in suctioning dust on a mop with use of a negative pressure of an electric vacuum cleaner.
[Solution] A hose coupling device 10 includes a connecting pipe 14, a branch pipe 15, a ball valve 40. The connecting pipe 14 has openings, one of the openings configured as a first inlet 31 and another one of the openings configured as an outlet 33 communicating with the one of the openings. The branch pipe 15 continues from a lateral surface of the connecting pipe 14 and has an opening configured as a second inlet 32. The ball valve 40 is arranged in a valve box 35 at which the connecting pipe 14 and the branch pipe 15 communicate such that the ball valve 40 is rotatable about a rotation axis corresponding to an axis of the branch pipe 15 while the ball valve 40 remains in contact with an inner wall of the valve box 35. The ball valve 40 includes a first sidewall 41, a second sidewall 42, a third sidewall 43 facing the branch pipe 15, a through hole 45, and a communicating groove 46 extending from the third sidewall 43 to the second sidewall 42. The ball valve 40 is configured to rotate about (Continued)

the rotation axis between a first communicating position to connect the first inlet 31 to the outlet 33 via the through hole 46 and a second communicating position to connect the second inlet 32 to the outlet 33 via the communicating groove 46.

3 Claims, 23 Drawing Sheets

(51) Int. Cl.
  *A47L 9/02* (2006.01)
  *A47L 7/00* (2006.01)
  *A47L 9/00* (2006.01)
  *A47L 9/24* (2006.01)
  *A47L 13/502* (2006.01)
  *F16K 31/60* (2006.01)

(52) U.S. Cl.
  CPC ............... *A47L 9/0072* (2013.01); *A47L 9/02* (2013.01); *A47L 9/248* (2013.01); *A47L 13/502* (2013.01); *F16K 31/607* (2013.01); *Y10T 137/86863* (2015.04); *Y10T 137/86871* (2015.04)

(58) Field of Classification Search
  USPC ................... 137/625.46, 625.47; 251/315.16
  See application file for complete search history.

(56) References Cited

U.S. PATENT DOCUMENTS

| | | | | |
|---|---|---|---|---|
| 4,573,498 | A | * | 3/1986 | Ludwig ............... F16K 11/0876 137/625.47 |
| 4,915,133 | A | * | 4/1990 | Harrison ............... F16K 5/0605 137/625.47 |
| 5,304,058 | A | * | 4/1994 | Gill ..................... B29C 45/1735 264/572 |
| 6,446,293 | B2 | | 9/2002 | Lindquist et al. |
| 7,455,372 | B2 | * | 11/2008 | Wang .................... B60T 17/043 251/315.16 |
| 8,689,392 | B2 | | 4/2014 | Kawamura |
| 2001/0002498 | A1 | | 6/2001 | Lindquist et al. |
| 2013/0036572 | A1 | | 2/2013 | Kawamura |

FOREIGN PATENT DOCUMENTS

| | | |
|---|---|---|
| JP | 10-061790 A | 3/1998 |
| JP | 2003-515373 A | 5/2003 |
| JP | 2004-242731 A | 9/2004 |
| JP | 2011-087669 A | 5/2011 |
| JP | 2011-212037 A | 10/2011 |
| JP | 2011-229629 A | 11/2011 |

* cited by examiner

HOSE COUPLING DEVICE, MOP SUCTION DEVICE, ELECTRIC VACUUM CLEANER, AND BALL VALVE

TECHNICAL FIELD

This invention relates to a hose coupling device, a mop suction device, an electric vacuum cleaner and a ball valve configured to remove dusts and the like from a cleaning mop with use of negative pressure of an electric vacuum cleaner.

BACKGROUND ART

A known hose coupling device, which is in use coupled to a hose or pipe of an electric vacuum cleaner, has a switch structure configured to switch the suction channel of the electric vacuum cleaner between a main suction channel and a sub suction channel (see Patent Document 1).

On the other hand, a mop using microfiber is in use as a cleaning tool cleaning a section having a complicated uneven surface, a floor portion alongside the wall, a section that is too narrow to accept the suction member of the electric vacuum cleaner, and a surface of a section onto which dusts are stick.

As the result of cleaning with the mop, a lot of dusts and the like adhere to the microfiber of the mop. If the cleaning is continued with such dusts and the like adhering to the mop, such adhering dusts and the like may fly off from the mop. In addition, during the cleaning with the mop, the microfiber of the mop may be attached not only with dusts but also with a solid object such as sand and metal pieces. If the cleaning is continued with such solid object attached to the mop, such solid object may damage the cleaning surface. Therefore, in order to prevent the fly-off of the dusts and the like from the mop and the damages to the cleaning surface, such dusts, sand, metal pieces and the like are required to be removed from the mop every time such dusts, sand, metal pieces and the like on the mop, by suctioning those on the mop with suctioning equipment (e.g., electric vacuum cleaner) or by beating the mop out of doors.

In view of the above, a known mop suction device, which is configured to suction dusts on the mop, is coupled to the hose of the electric vacuum cleaner as is the hose coupling device described above. Then, by switching the suction channel of the electric vacuum cleaner from a main suction channel to a sub suction channel, the mop suction device suctions dusts, dirt, foreign matters and the like adhering to the mop into the sub suction channel with use of the negative pressure applied by the electric vacuum cleaner (see Patent Document 2). The mop suction device is open at its both ends, and tubular so as to accept the insertion of the mop. The mop suction device also includes a cleaning portion having a slit at its lateral surface. According to such mop suction device, a grip of the mop is inserted into a cleaning portion through the slit while the grip of the mop is being held by a hand, and the microfiber of the mop having been expansively bulked due to the static electricity is pulled into the cleaning portion while being narrowed. The dusts and the like having adhered to the mop is suctioned by the negative pressure of the electric vacuum cleaner within the cleaning portion.

RELATED ART DOCUMENT

Patent Document

Patent Document 1: Japanese Unexamined Patent Application Publication No. 2011-212037

Patent Document 2: Japanese Unexamined Patent Application Publication No. 2011-087669

DISCLOSURE OF THE PRESENT INVENTION

Problem to be Solved by the Invention

However, the mop suction device described above requires a floor cleaning member of the electric vacuum cleaner to be constantly in contact with the ground, in order to keep high the negative pressure within the hose or the pipe to which the cleaning portion configured to suction the dusts and the like is coupled, while the mop suction device is coupled to the electric vacuum cleaner. In addition, in order to obtain a stronger suction power, the suction channel of a suction device for floor cleaning is required to be closed so as to secure the suction channel dedicated to the mop suction device.

The technique as disclosed herein, which has been created in view of the problems described above, serves to provide a hose coupling device, a mop suction device, an electric vacuum cleaner and a ball valve configured to significantly increase the convenience in suctioning dusts and the like adhering to a mop with use of a negative pressure of an electric vacuum cleaner.

The technique as disclosed herein, which has been created in view of the problems described above, serves to provide: a mop suction device configured to prominently enhance the convenience in suctioning dusts and the like adhering to a mop with use of a negative pressure of an electric vacuum cleaner; and a hose coupling device, an electric vacuum cleaner and a ball valve configured to allow a suction device (such as mop suction device) to be coupled to a hose or hose connector between a suction device of an electric vacuum cleaner for floor cleaning and a dust collection casing of the electric vacuum cleaner.

Means for Solving the Problem

An aspect of the technologies disclosed herein relates to a hose coupling device including a hollow connecting pipe, a branch pipe, and a ball valve. The connecting pipe has openings at ends, respectively. One of the openings is configured as a first inlet. Another one of the openings is configured as an outlet that communicates with the one of the openings. The branch pipe continues from a lateral surface of the connecting pipe and has an opening configured as a second inlet. The ball valve has a spherical shape and arranged in a valve box at which the first inlet of the connecting pine and the second inlet of the branch pipe communicate such that the bass valve is rotatable about a rotation axis corresponding to an axis of the branch pipe while the ball valve remains in contact with an inner wall of the valve box. The ball valve includes a first sidewall, a second sidewall, a third sidewall facing the branch pipe, a through hole, and a communicating groove extending from the third sidewall to the second sidewall. The ball valve is configured to rotate about the rotation axis between a first communicating position to connect the first inlet to the outlet via the through hole and a second communicating position to connect the second inlet to the outlet via the communicating groove with the first sidewall faced toward the first inlet and the second sidewall faced toward the outlet.

According to the hose coupling device described above, the communicating position is switchable between the first communicating position and the second communicating position. For instance, the communicating channel that is formed at the second communicating position can be exclusively used for suctioning dust on the mop. With this configuration, the maximum suction power can be increased from that provided by a known configuration in which a suction channel for floor cleaning and a suction channel for suctioning dust on a mop are connected. As the result, a larger adjustable range of the suction power is achieved, and the convenience in suctioning the dusts on the mop is significantly enhanced.

According to a known technique, when a handy vacuum cleaner for vehicle interior is in use, and a connector of a crevice nozzle of the cleaner is coupled with an device for suctioning dusts and the like adhering to a mop, it has been difficult to seal the crevice nozzle. According to the hose coupling device described above, however, a dedicated suction channel is secured for suctioning the dusts and the like of the mop. Therefore, when the crevice nozzle is coupled to the handy vacuum cleaner via the hose coupling device, the crevice nozzle is easily sealed. Accordingly, in cleaning with the mop the sections of the vehicle interior which are difficult to clean with the crevice nozzle, the dusts and the like adhering to the mop is constantly suctioned through the hose coupling device coupled to the handy vacuum cleaner. Thus, the vehicle interior is kept clean. The hose coupling device described above may be coupled not only with the crevice nozzle, but also with a brush nozzle or other various devices.

In the hose coupling device described above, when the first inlet is connected to the outlet, a first communicating channel may be formed, and when the second inlet is connected to the outlet, a second communicating channel may be formed, through which the second inlet and the outlet are in communication with each other. The first communicating channel may be separated from the second communicating channel by the inner wall of the ball valve to be independent of each other.

According to this configuration, when the dusts and the like are suctioned through either one suction channel of the first communicating channel and the second communicating channel, the dusts and the like do not leak into the other suction channel. Therefore, the clogging or the like of the other suction channel with the dusts and the like is prevented.

In the hose coupling device described above, the ball valve may be configured to rotate at different angle to adjust a flow rate from the first inlet to the outlet at the first communicating position and a flow rate from the second inlet to the outlet at the second communicating position.

According to this configuration, by adjusting the rotation angle of the ball valve, the communicating position is gradually switched between the first communicating position and the second communicating position. Therefore, the suction power during the first communicating position and the suction power during the second communicating position are minutely adjustable. Accordingly, the convenience in suctioning the dusts and the like of the mop is prominently enhanced, as compared to a configuration where the communicating position is instantly switched between the first communicating position and the second communicating position.

In the hose coupling device described above, the branch pipe may be a first branch pipe, and the hose coupling device may further include a second branch pipe continuing from a lateral surface of the connecting pipe and having an opening configured as a third inlet. In such a hose coupling device, the ball valve may include a fourth sidewall located on an opposite side of the through hole from the third sidewall and facing the second branch pipe. The communicating groove may extend from the third sidewall and the fourth sidewall to the second sidewall, and the second inlet and the third inlet may be connected to the outlet via the communicating groove at the second communicating position.

According to this configuration, the communicating channel through which the second inlet, the third inlet and the outlet are in communication with one another at the second communicating position may be dedicated to suctioning the dusts on the mop. Therefore, each of the first branch pipe and the second branch pipe may be coupled with a device for suctioning the dusts and the like on the mop, and the versatility of the hose coupling device is enhanced.

In the hose coupling device described above, the branch pipe may be a first branch pipe and the communicating groove may serve as a first communicating groove, and the hose coupling device may further include a second branch pipe continuing from a lateral surface of the connecting pipe and having an opening configured as a third inlet. In such a hose coupling device, the ball valve may include a fourth sidewall located on an opposite side of the through hole from the third sidewall and facing the second branch pipe. The ball valve may include a second communicating groove extending from the first sidewall to the fourth sidewall. The second communicating groove may be independent of first communicating groove. With such configuration, the second inlet is connected to the outlet via one of the first communicating groove and the second communicating groove at the second communicating position.

According to this configuration, by rotating the ball valve in the first communicating position about the axis of the branch pipe, the communicating position is switched to either second communicating position where the second inlet is connected to the outlet via the first communicating groove, or second communicating position where the second inlet is connected to the outlet via the second communicating groove. Therefore, when each of the first branch pipe and the second branch pipe is coupled with a device for suctioning the dusts on the mop, the communicating position is instantly switched from the first communicating position to the second communicating position no matter whether the ball valve rotates clockwise or counterclockwise about the axis of the branch pipe. Accordingly, the convenience of the hose coupling device is further enhanced.

In the hose coupling device described above, the ball valve may include a ball valve rib that extends from a portion facing the branch pipe in an axial direction of the branch pipe. The ball valve may rotates about the rotation axis corresponding to the axis of the branch pipe with an end of the ball valve rib pushed in a direction about the axis of the branch pipe.

According to this configuration, for instance, a device having the rib that extends in the axial direction of the branch pipe is coupled to the branch pipe while the end of the rib approaches or contacts the end of the ball valve rib in the direction about the axis of the branch pipe. In the above configuration, by rotating the device about the axis of the branch pipe, the rib of the device pushes the ball valve rib in the direction about the axis of the branch pipe. Therefore, even without providing the communicating groove of the ball valve with, for instance, a rotary shaft or other member serving as a rotary axis, the ball valve is rotatable. By providing to a portion of the ball valve that is outside of the communicating groove a rotation receiving portion (e.g., the rib described above) that receives the rotation from the device coupled to the branch pipe, the intake air and the like flowing through the communicating groove smoothly flows within the communicating groove without being impeded by obstacles. Thus, a more favorable suction power is secured in the second communicating state.

Another aspect of the technique as disclosed herein relates to a mop suction device including a tubular cleaning portion. A connecting pipe of the cleaning portion may be rotatably configured to be coupled to the branch pipe of the above-described hose coupling device. In such a mop suction device, the cleaning portion may be configured to rotate for switching between the first communicating position and the second communicating position through rotation of the cleaning portion of the ball valve mounted with the rotation axis at a rotation center of the connecting pipe.

According to the mop suction device described above, a single operation to rotate the tubular cleaning portion also switches the communicating position between the first communicating position and the second communicating position. Therefore, the communicating position is easily switched between the first communicating position and the second communicating position as compared to a configuration where the mechanism switching the communicating position between the first communicating position and the second communicating position is provided separately from the mechanism rotating the cleaning portion. Thus, the convenience in suctioning the dusts and the like of the mop is prominently enhanced.

In the mop suction device described above, the cleaning portion may include openings at ends of a tubular peripheral wall, and the openings may be formed such that inner peripheral edge portions spread outward while the opening portions include curved portions that extend toward the center of the peripheral wall.

According to this configuration, at the time of pulling the microfiber of the mop into the tubular cleaning portion while narrowing the microfiber, even when the microfiber is deformed in the pull-in direction, the curved portions correct the deformation. Therefore, the configuration prominently reduces the fly-off of the dusts on the mop when the microfiber of the mop is pulled into the cleaning portion. In addition, the configuration prevents or suppresses the microfiber from being caught by the opening edge of the cleaning portion when the microfiber of the mop is pulled into the cleaning portion. Accordingly, the configuration prevents or suppresses the dusts on the microfiber from dropping off therefrom due to the opening edge of the cleaning portion.

In the mop suction device described above, the peripheral wall of the cleaning portion may have a slit in a lateral surface. The slit may extend from one of the openings to another one of the opening portions. The mop suction device may further include a flexible cover fixed to the cleaning portion so as to cover the slit.

According to this configuration, the cover prevents or suppresses the dusts on the mop from flying off through the slit of the lateral surface of the cleaning portion when the mop rotates in the front and back direction for the suction of the dusts on the mop.

A still further aspect of the technique as disclosed herein relates to an electric vacuum cleaner including: a main body including a dust collecting chamber; a floor cleaning suction member; a hose including a hose connecting portion at an end thereof. In the above-described hose coupling device, the hose coupling device may be attached to a portion of the hose between the floor cleaning suction member and the dust collecting chamber or to the hose connecting portion. Therefore, not only a canister vacuum cleaner but also other various vacuum cleaner such as an upright vacuum cleaner and a handy vacuum cleaner can be coupled with a couplable suction device such as the above-described mop suction device, by providing the above-described branch pipe to a lateral surface of the hose (suction channel) between the distal end of the floor cleaning suction member or the like and the dust collecting chamber, and by providing the above-described valve box and the above-described ball valve to the merge portion.

This configuration provides an electric vacuum cleaner with which the convenience in suctioning the dusts on the mop is significantly increased.

A still further aspect of the technique as disclosed herein relates to a spherical ball valve including: a through hole running through the ball valve; a first sidewall; a second sidewall located on an opposite side of the through hole from the first sidewall; a third sidewall; a fourth sidewall adjoining to the first sidewall and the second sidewall and located on an opposite side of the through hole from the third sidewall; and at least a communicating groove extending from the third sidewall to the second sidewall, and a communicating groove extending from the third sidewall and the fourth sidewall to one of the second sidewall and the first sidewall.

According to this configuration, for instance, by rotatably disposing the ball valve described above in the inside of the pipe member having the branch pipe as the switching valve for switching the channels, the communicating position is switchable between the position where the main channel passing through the through hole in the pipe member is in communication and the position where the branch channel passing through at least one of the communicating grooves is in communication. Therefore, for instance, by coupling the pipe member to the connector of the hose of the electric vacuum cleaner or the like, and dedicating the branch channel to suctioning the dusts and the like of the mop, the maximum suction power is increased in the suction channel for suctioning the dusts and the like of the mop, as compared to a known configuration where the suction channel for floor cleaning and the suction channel for suctioning the dusts and the like of the mop are in communication with each other. As the result, the suction power is adjustable in a wider range, and the convenience in suctioning the dusts and the like of the mop is significantly increased.

Advantageous Effect of the Invention

According to the aspect of the technique as disclosed herein, the convenience in suctioning the dusts and the like of the mop with use of the negative pressure of the electric vacuum cleaner is significantly increased.

MODE FOR CARRYING OUT THE INVENTION

First Embodiment

Figure 1:
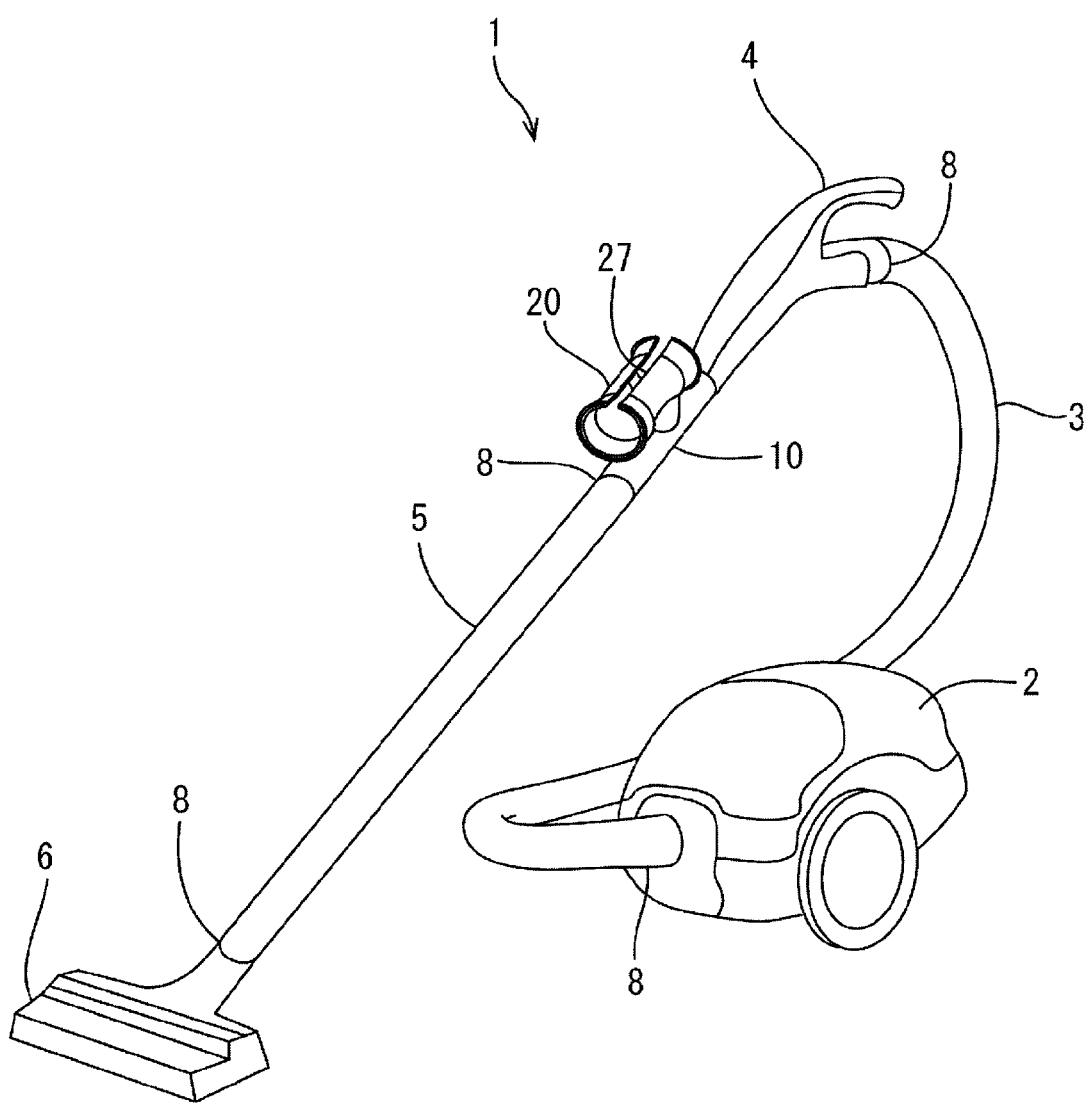
FIG. 1 is a perspective view depicting an electric vacuum cleaner in which a hose coupling device attached with a mop suction device is coupled to a hose connector of the electric vacuum cleaner.

A first embodiment will be described with reference to the attached drawings. This embodiment exemplifies a hose coupling device 10 and a mop suction device 20 attached to an electric vacuum cleaner 1. As depicted in FIG. 1, the electric vacuum cleaner 1 includes: a main body 2; a main body hose 3 extending from the main body 2; a hose grip 4 attached to a distal end of the main body hose 3; a hose 5; and a floor suction member 6 configured to suction dusts and the like on the floor. Joints of the members serve as hose connectors 8. The hose coupling device 10 as described above is connected to an end of the hose 5, more specifically to a hose connector 8 located between the hose grip 4 and the hose 5.

Figure 2:
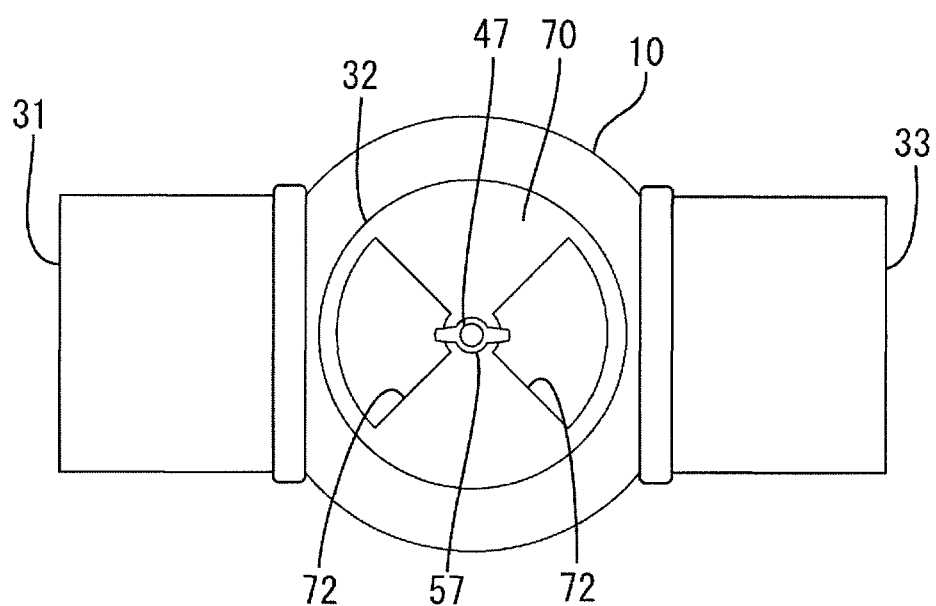
FIG. 2 is a top view depicting the hose coupling device seen from a branch pipe.
Figure 4:
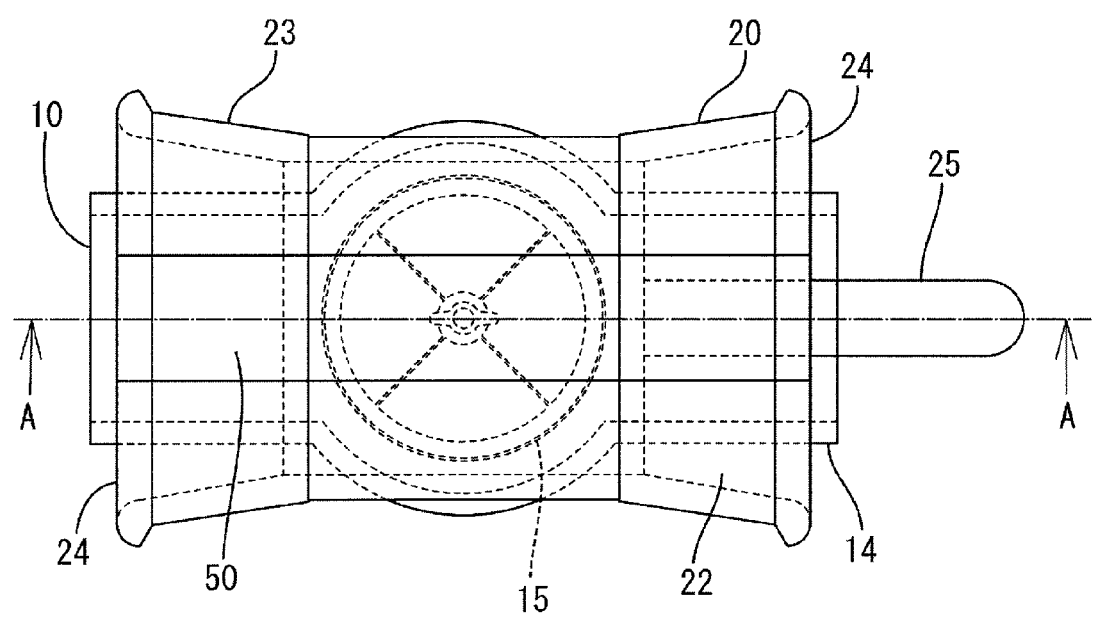
FIG. 4 is a top view transparently depicting the mop suction device when a cleaning portion of the mop suction device and the hose coupling device are positioned in parallel with each other.
Figure 5:
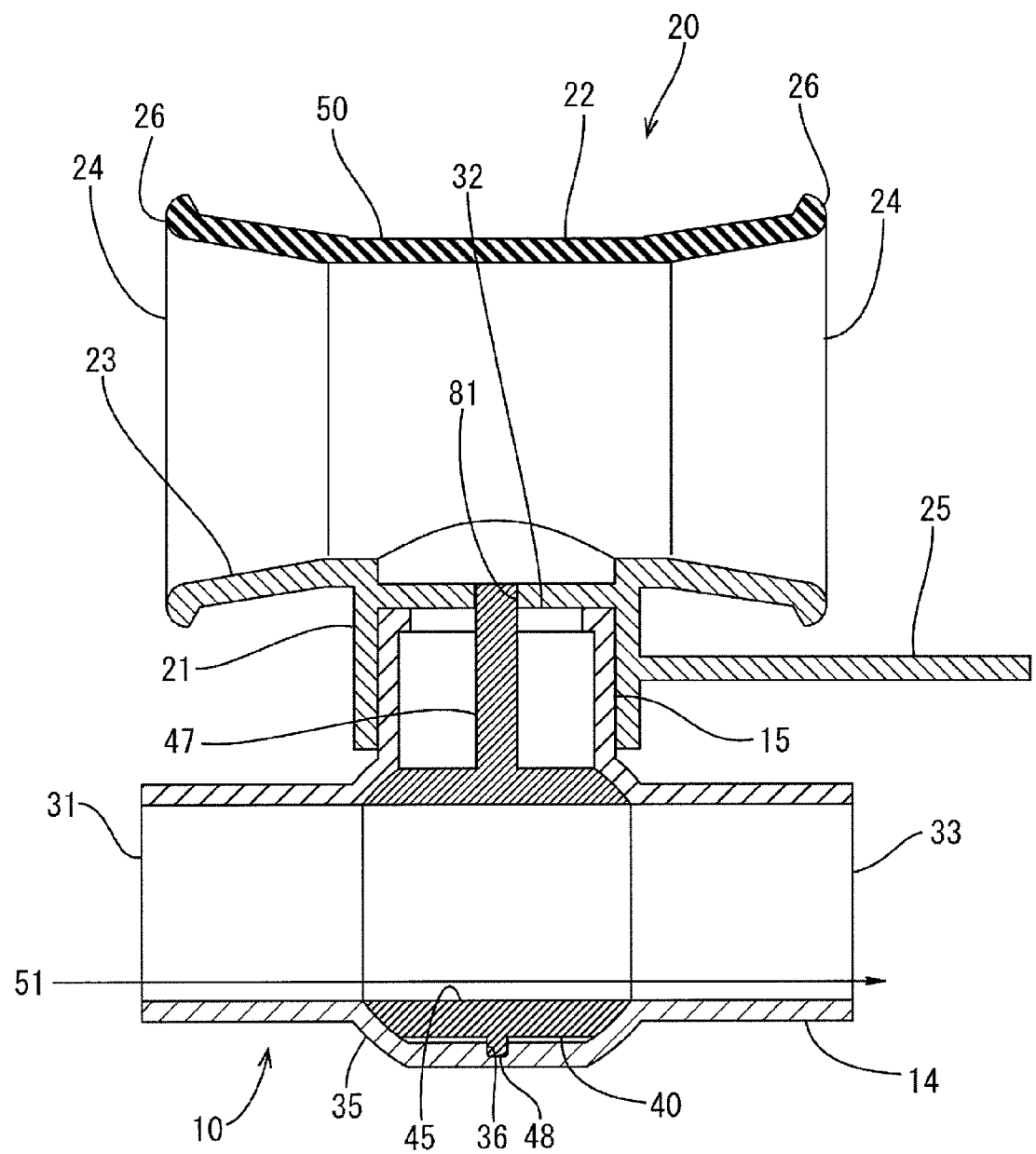
FIG. 5 is a cross sectional view depicting a cross section taken along A to A in FIG. 2.

As depicted in FIGS. 2, 4 and 5, the hose coupling device 10 includes: a connecting pipe 14; a branch pipe 15 branching from a lateral surface of the connecting pipe 14; and a ball valve 40 disposed on a boundary between the connecting pipe 14 and the branch pipe 15. The connecting pipe 14 is a hollow cylinder whose both ends are open. The branch pipe 15 branches from substantially the axially middle position of the lateral surface of the connecting pipe 14, and the distal end of the branch pipe 15 is open. The hose coupling device 10 is connected to the hose connector 8 of the electric vacuum cleaner 1 in a posture where the axis of the connecting pipe 14 coincides with the direction in which the hose 5 of the electric vacuum cleaner 1 extends.

As depicted in FIG. 2, the opening at the distal end of the branch pipe 15 is fixed with a coupling device rotary valve 16, and the coupling device rotary valve 16 has a substantially circular plate shape and closes the opening of the branch pipe 15. The center of the coupling device rotary valve 70 has a shaft through hole 71. The shaft through hole 71 allows a distal end of a rotary shaft 47 of the ball valve 40 (described later) to penetrate therethrough, and the distal end of the rotary shaft 47 protrudes outward from the branch pipe 15. The distal end of the rotary shaft 47 protruding outward from the branch pipe 15 is attached with a shaft auxiliary member 57. The coupling device rotary valve 70 includes two coupling device valve openings 72 positioned to be symmetric with each other with respect to the shaft through hole 71.

In the connecting pipe 14 connected to the hose connector 8, as depicted in FIG. 5, a first opening located closer to the floor suction member 6 of the electric vacuum cleaner 1 serves as a first inlet 31, and a second opening located closer to the main body 2 of the electric vacuum cleaner 1 serves as an outlet 33. The opening at the distal end of the branch pipe 15 serves as a second inlet 32 which accepts the flow through an opening 78 of the coupling device valve described above. Therefore, when the electric vacuum cleaner 1 is operated, the electric vacuum cleaner 1 sucks in the direction indicated by an arrow in FIG. 5.

The ball valve 40 included in the hose coupling device 10 is substantially spherical, and disposed in a valve box 35 located at the boundary between the connecting pipe 14 and the branch pipe 15 (more specifically, the valve box 35 is located at a position where the first inlet 31 merges with the second inlet 32) while in contact with inner walls of the valve box 35. Therefore, the ball valve 40 seals up between the connecting pipe 14 and the branch pipe 15.

Figure 8:
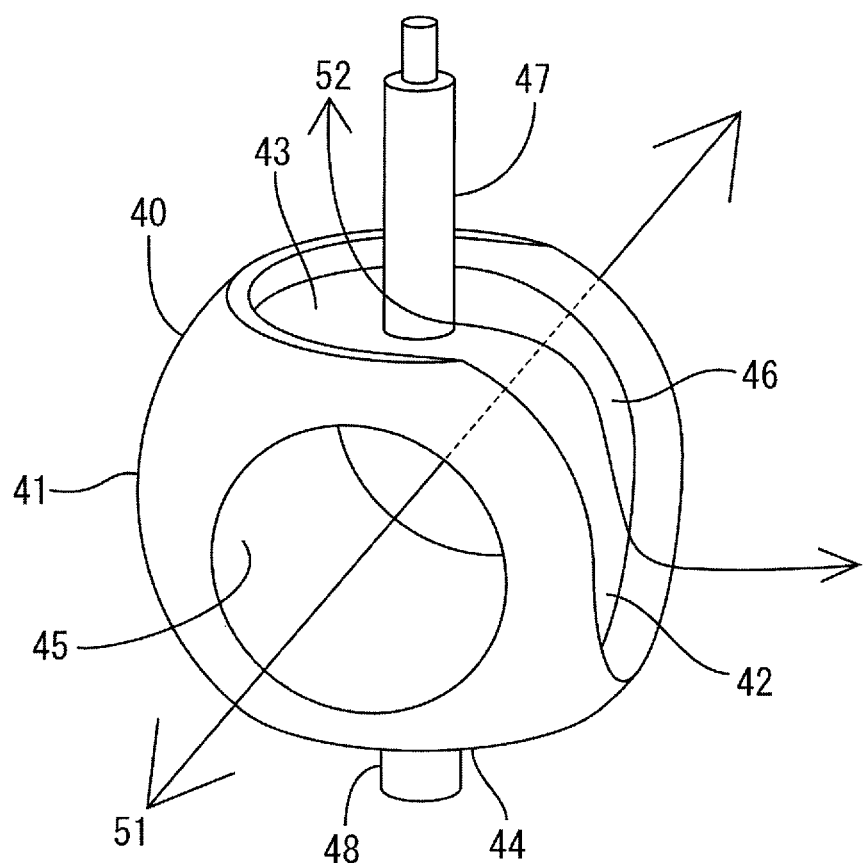
FIG. 8 is a perspective view depicting a ball valve.
Figure 9:
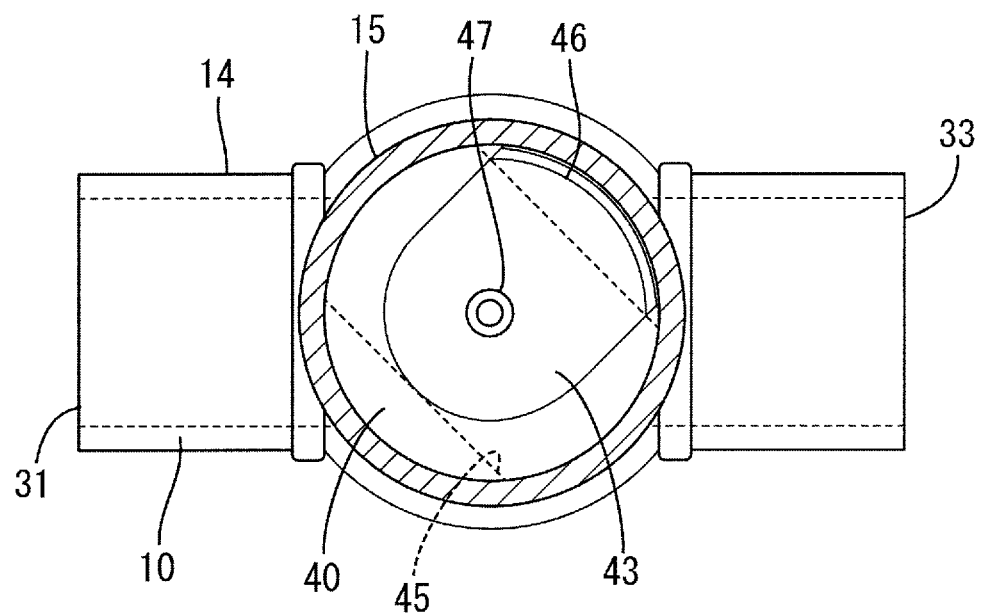
FIG. 9 is a top cross sectional view depicting the hose coupling device being switched from a first communicating state to a second communicating state.

As depicted in FIG. 8, the ball valve 40 has a through hole 45 that runs through the ball valve 40 and a communicating groove 46 formed in a lateral wall of the through hole 45. In the following description, sidewalls of the ball valve 40 positioned at both sides of the through hole 45 will be referred to as the first sidewall 41 and the second sidewall 42, respectively. A sidewall of the ball valve 40 which faces the branch pipe 15 when the ball valve 40 is disposed within the valve box 35 will be referred to as the third sidewall 43. A sidewall of the ball valve 40 located on an opposite of the through hole 45 from the third sidewall 43 will be referred to as the fourth sidewall 44.

The through hole 45 has the inner diameter that is substantially equal to the inner diameter of the connecting pipe 14. The communicating groove 46 is formed by partially hollowing out the sidewall of the ball valve 40 (see FIG. 8), so as to extend from the third sidewall 43 to the second sidewall 42. As depicted in FIG. 5 and the like, a part of the communicating groove 46 in the third sidewall 43 is provided with the rotary shaft 47 that, when the ball valve 40 is disposed in the valve box 35, extends in an axial direction of the branch pipe 15 toward the opening of the branch pipe 15. In the axial direction of the branch pipe 15, the position of the distal end of the rotary shaft 47 is substantially coincident with the position of the opening of the branch pipe 15.

The fourth sidewall 44 of the ball valve 40 has a shaft protrusion 48 that shallowly protrudes to form a shaft shape in the axial direction of the branch pipe 15. The ball valve 40 is disposed within the valve box 35 in a manner rotatable about the axis of the branch pipe 15, with the shaft protrusion 48 fitted into a recess 36 (see FIGS. 5 and 7). The recess 36 is provided to the inner wall 36 of the valve box 35 in the hose coupling device 10.

In the hose coupling device 10 in which the ball valve 40 is arranged in the valve box 35, when the penetrating direction of the through hole 45 coincides with the axial direction of the connecting pipe 15 (the state as depicted in FIGS. 4 and 5), a communicating channel that extends from the first inlet 31 to the outlet 33 via the through hole 45 is formed (hereinafter referred to as the first communicating channel 51). In the following description, the state where the first inlet 31 and the outlet 33 are connected with each other via the through hole 45 will be referred to as the first communicating state.

Figure 6:
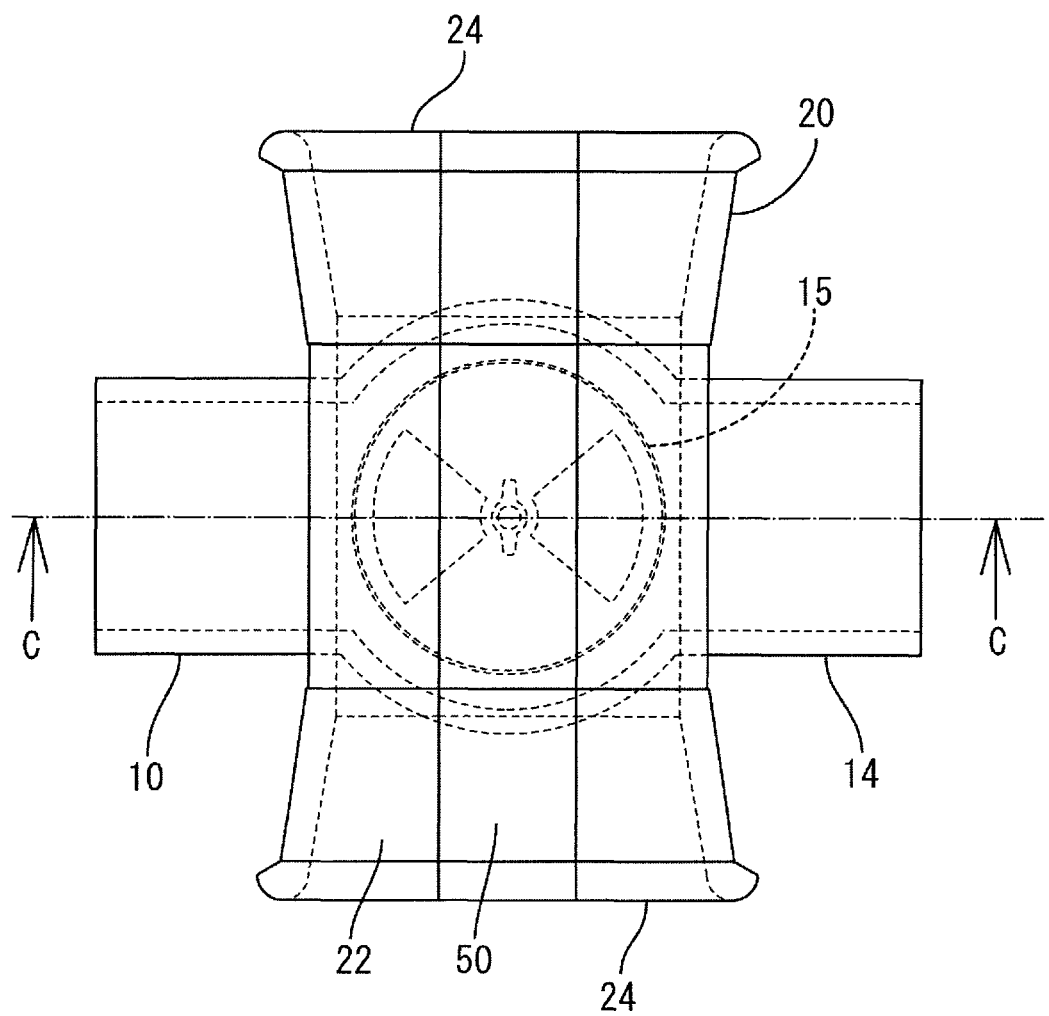
FIG. 6 is a top view transparently depicting the mop suction device when the cleaning portion of the mop suction device and the hose coupling device are positioned perpendicularly to each other.
Figure 7:
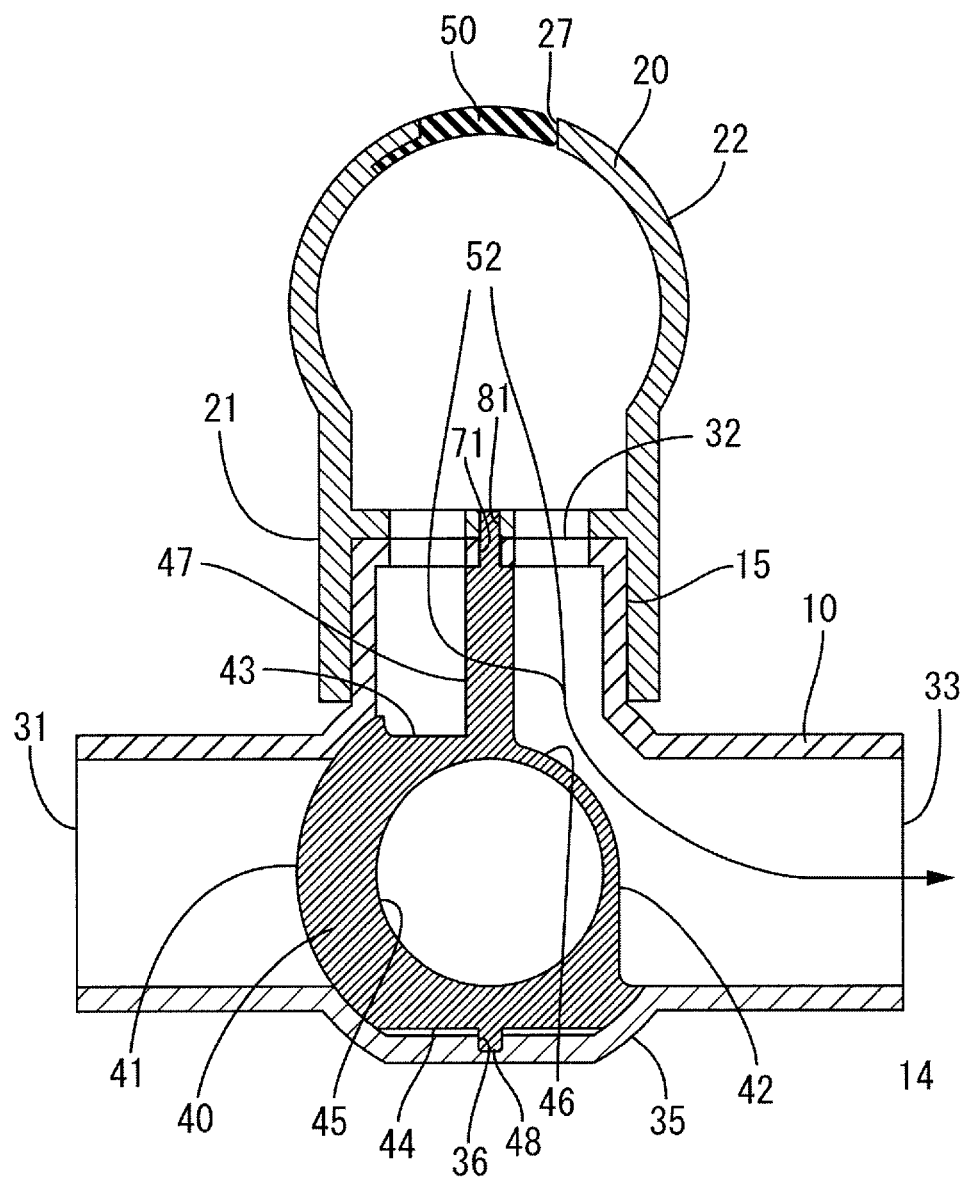
FIG. 7 is a cross sectional view depicting a cross section taken along C to C in FIG. 4.

When the ball valve 40 rotates by substantially 90 degrees about the axis of the branch pipe 15 from the state as depicted in FIGS. 4 and 5, the first sidewall 41 faces the first inlet 31 and the second sidewall 42 faces the outlet 33 (i.e., the state as depicted in FIGS. 6 and 7), such that the first inlet 31 and the outlet 33 are completely closed by the ball valve 40. In the above state, a communicating channel that extends from the second inlet 32 to the outlet 33 via the communicating groove 46 is formed (hereinafter referred to as the second communicating channel 52). The first communicating channel 51 and the second communicating channel 52 are separated from each other by the inner wall of the ball valve 40, and thus are formed independently of each other. In the following description, the state where the second inlet 32 and the outlet 33 are connected with each other via the communicating groove 46 will be referred to as the second communicating state.

In the hose coupling device 10 in which the ball valve 40 is disposed within the valve box 35, by rotating the rotary shaft 47 of the ball valve 40, the ball valve 40 rotates about the axis of the branch pipe 15, and the communication state is switched between the first communicating state and the second communicating state. The sealing up between the connecting pipe 14 and the branch pipe 15 by the ball valve 40 prevents the intake air passing through the first communicating channel 51 in the first communicating state from leaking into the second inlet 32, and also prevents the intake air passing through the second communicating channel 52 in the second communicating state from leaking into the first inlet 31.

FIG. 7 is a top cross sectional view depicting the hose coupling device 10 being switched from the first communicating position to the second communicating position. As depicted in FIG. 7, by adjusting the rotary angle of the rotary shaft 47, the flow rate of the flow from the first inlet 31 to the outlet 33 at the first communicating position, and the flow rate of the flow from the second inlet 32 to the outlet 33 at the second communicating position are also adjusted.

Figure 3:
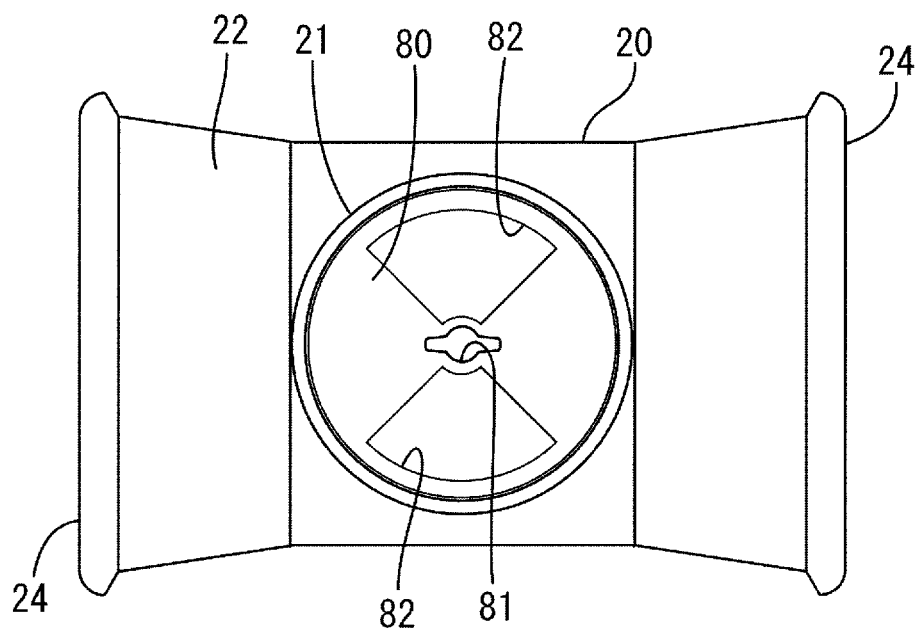
FIG. 3 is a top view depicting the mop suction device seen from a connecting pipe.

In the description that follows, the mop suction device 20 coupled to the hose coupling device 10 will be described. As depicted in FIG. 3, the mop suction device 20 includes: a cylinder-shaped connecting pipe 21 coupled to the branch pipe 15 of the hose coupling device 10; and a substantially tubular cleaning portion 22 connected to the connecting pipe 21.

The connecting pipe 21, which is open at both ends, has the inner diameter that is one size greater than the outer diameter of the branch pipe 15 of the hose coupling device 10. The connecting pipe 21 is coupled to the branch pipe 15 in a manner rotatable about the axis of the branch pipe 15, and the connecting pipe 21 covers substantially the entirety of the outer surface of the branch pipe 15. The connecting pipe 21 has a rotary handle 25 at a portion of its outer surface, and the rotary handle 25 extends outward to form a rod shape.

The cleaning portion 22 includes opening portions 24 provided by opening both ends of a substantially tubular peripheral wall 23. The cleaning portion 22 is coupled to the connecting pipe 21 in a posture where the axis of the cleaning portion 22 is perpendicular to the axis of the connecting pipe 21. Therefore, by rotating the rotary handle 25 extending from the connecting pipe 21 about the axis of the connecting pipe 21, the connecting pipe 21 as well as the cleaning portion 22 coupled to the connecting pipe 21 are rotated about the axis of the connecting pipe 21.

The opening portions 24 of the cleaning portion 22 are formed such that the inner peripheral ends thereof are widened outward. The opening portions 24 also have curved portions 26 (see FIG. 5) that extend toward the center of the peripheral wall 23.

As depicted in FIG. 1, the cleaning portion 22 has a slit 27 that extends from a first opening portion 24 to a second opening portion 24, and the slit 27 is provided on a lateral surface of the peripheral wall 23 at a position opposite to the position where the peripheral wall 23 is coupled to the branch pipe 15. A cover 50 may be fixed to a first end of the slit 27 to close the slit 27. FIGS. 6, 7 and the like depict the slit 27 of the cleaning portion 22 being fixed with the cover 50 made of a rubber foam.

As depicted in FIG. 3, the opening of the connecting pipe 21 opposite to the opening coupled with the cleaning portion 22 is fixed with a substantially disk-shaped suction device rotary valve 80, and the suction device rotary valve 80 closes the opening. The center of the suction device rotary valve 80 has a shaft fixing hole 81. The shaft fixing hole 81 is fixed with the shaft auxiliary member 57 attached to the distal end of the rotary shaft 47 of the ball valve 40. The suction device rotary valve 80 has two suction device valve openings 82 positioned to be symmetric to each other with respect to the shaft fixing hole 81. The suction device valve openings 82 have substantially the same shapes and sizes as the coupling device valve openings 72 described above.

In a state where the hose coupling device 10 is coupled to the mop suction device 20, when the axis of the cleaning portion 22 is made substantially in parallel to the axis of the connecting pipe 14 by rotating the mop suction device 20, the suction device valve openings 82 and the coupling device valve openings 72 are layered upon each other, such that the connecting pipe 21 and the branch pipe 15 are brought into communication with each other. With this operation, the second inlet 32 of the branch pipe 15 is brought into communication with the cleaning portion 22 through the connecting pipe 21. On the other hand, when the axis of the cleaning portion 22 is made substantially perpendicular to the axis of the connecting pipe 14 by rotating the mop suction device 20, the suction device valve openings 82 are closed by the coupling device rotary valve 70 (in other words, the coupling device valve openings 72 are closed by the suction device rotary valve 80), and the connecting pipe 21 and the branch pipe 15 are shielded from communicating with each other.

When the hose coupling device 10 is coupled with the mop suction device 20, the shaft fixing hole 81 of the suction device rotary valve 80 is fixed with the shaft auxiliary member 57 attached to the distal end of the rotary shaft 47 of the ball valve 40. Therefore, in accordance with the rotation of the mop suction device 20, the ball valve 40 rotates. Accordingly, by rotating the rotary handle 25, the ball valve 40 rotates about the axis of the connecting pipe 21 (i.e., axis of the branch pipe 15) along with the connecting pipe 21 and the cleaning portion 22. Hence, in the second communicating state of the hose coupling device 10, a communicating channel is formed through which the cleaning portion 22 of the mop suction device 20 and the outlet 33 are in communication with each other.

Figure 10:
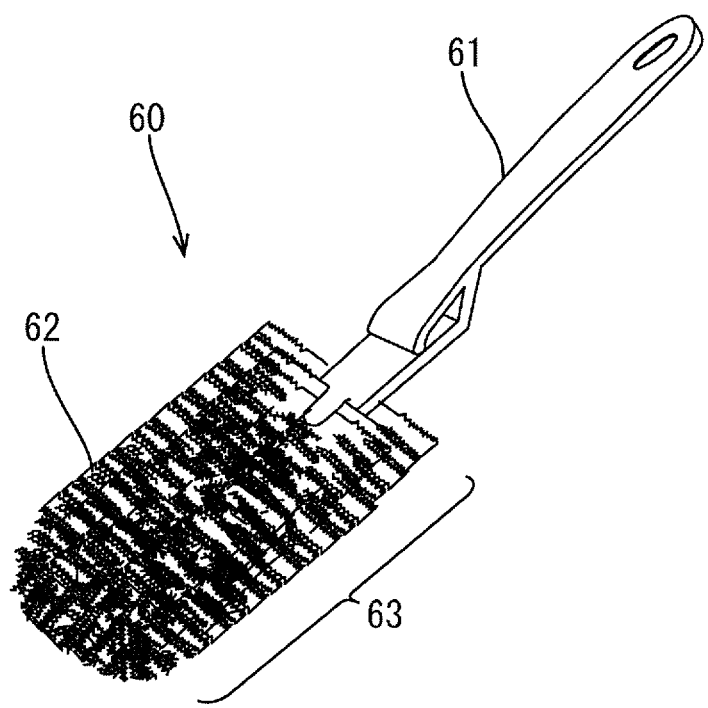
FIG. 10 is a perspective view depicting a mop.
Figure 11:
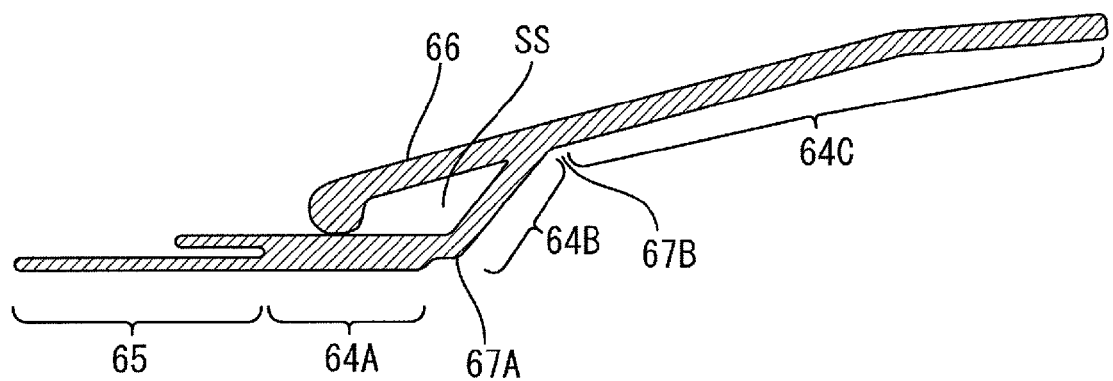
FIG. 11 is a cross sectional view depicting a cross section of the mop taken in a direction in which a grip of the mop extends.

A mop 60 depicted in FIG. 10 includes: a grip 61 made of a flexible material; and fibers 62 attached to a distal end of the grip 61. As depicted in FIG. 11, the grip 61 includes: a first grip portion 64A; a second grip portion 64B; a third grip portion 64C provided to a first end thereof; a fiber fixing portion 65 provided to a second end thereof; and a nail 66. The fibers 62 are fixed to the fiber fixing portion 65 and made of microfiber group 63 so as to preferably attract dusts and the like.

The first grip portion 64A continues from the fiber fixing portion 65. The second grip portion 64B continues from the first grip portion 64A via a first bending portion 67A. The third grip portion 64C continues from the second grip portion 64B via a second bending portion 67B. The nail 66 is made of an easily flexible material made of polypropylene. The nail 66 extends from the second bending portion 67B in the direction opposite to the grip (i.e., toward the first grip portion 64A) while maintaining a separation space SS with the first grip portion 64A. The distal end of the nail 66 is in contact with the lateral surface of the first grip portion 64A.

Figure 12:
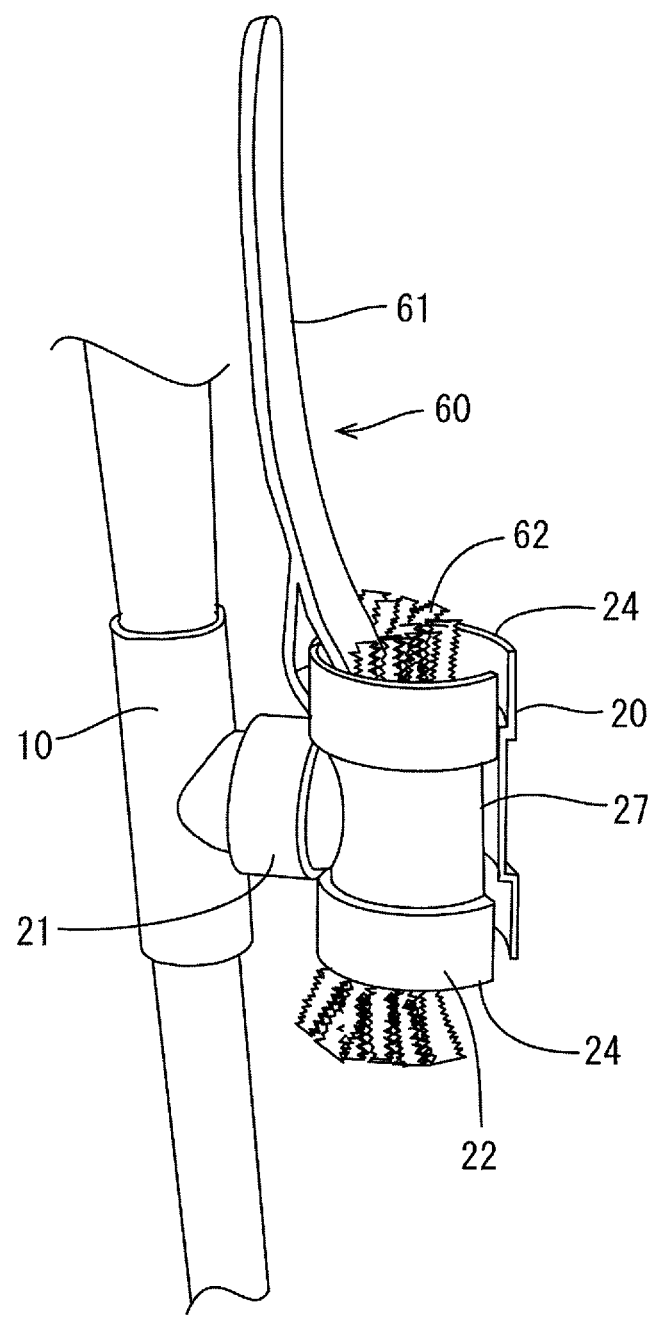
FIG. 12 is a perspective view depicting the mop suction device and the hose coupling device when the mop is locked to an opening end of the cleaning portion of the mop suction device.
Figure 13:
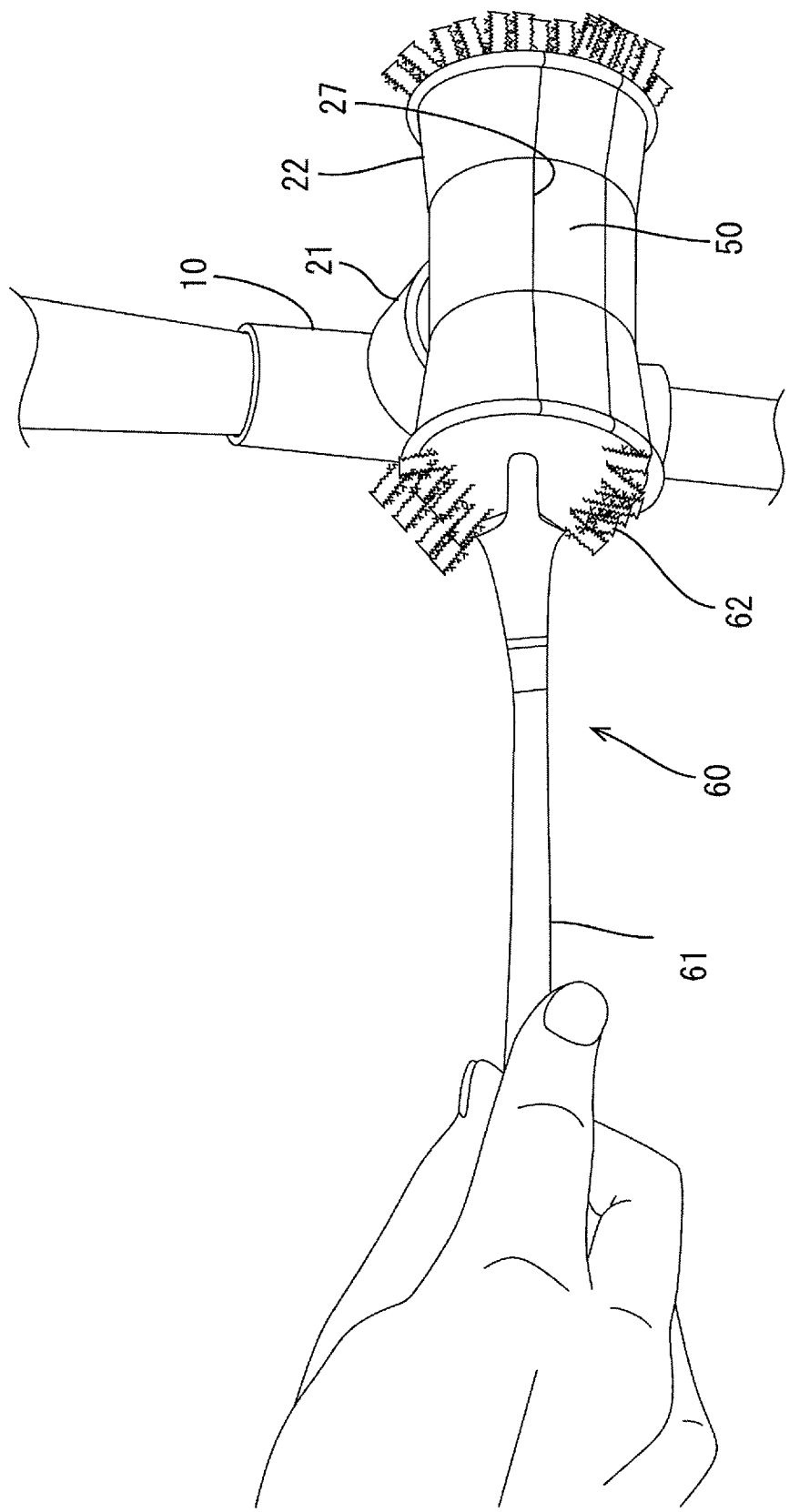
FIG. 13 is a perspective view depicting the mop suction device and the hose coupling device when dusts and the like adhering to the mop are being suctioned.

As depicted in FIG. 12, the mop 60 is locked to the mop suction device 20 by sandwiching the edge of the opening portion 24 of the cleaning portion 22 of the mop suction device 20 between the nail 75 and the lateral surface of the first grip portion 71.

In the following description, the description will be made with respect to operations to suction dusts and the like of the mop 60 with use of the hose coupling device 10 and the mop suction device 20 attached to the electric vacuum cleaner 1. First of all, by rotating the rotary handle 25 of the mop suction device 20, the hose coupling device 10 is switched from the first communicating state to the second communicating state.

Then, the grip 61 of the mop 60 to which the dust and the like adhere is inserted into the cleaning portion 22 through the slit 27 of the cleaning portion 22 of the mop suction device 20, and the fibers 62 of the mop 60 are pulled into the cleaning portion 22 by narrowing the fibers 62. By operating the electric vacuum cleaner 1 in this state, the dust and the like that adhere to the fibers 62 of the mop 60 are suctioned through the second communicating channel by the suctioning power applied by the electric vacuum cleaner 1.

By switching the hose coupling device 10 to the second communicating state, the first communicating channel 51 is completely closed. Therefore, the dusts and the like adhering to the fibers 62 of the mop 60 are suctioned with the maximum suctioning power of the electric vacuum cleaner 1. Accordingly, with the hose coupling device 10 of this embodiment, the convenience in the suction operations will be prominently enhanced as compared to a known technique.

Second Embodiment

Figure 14:
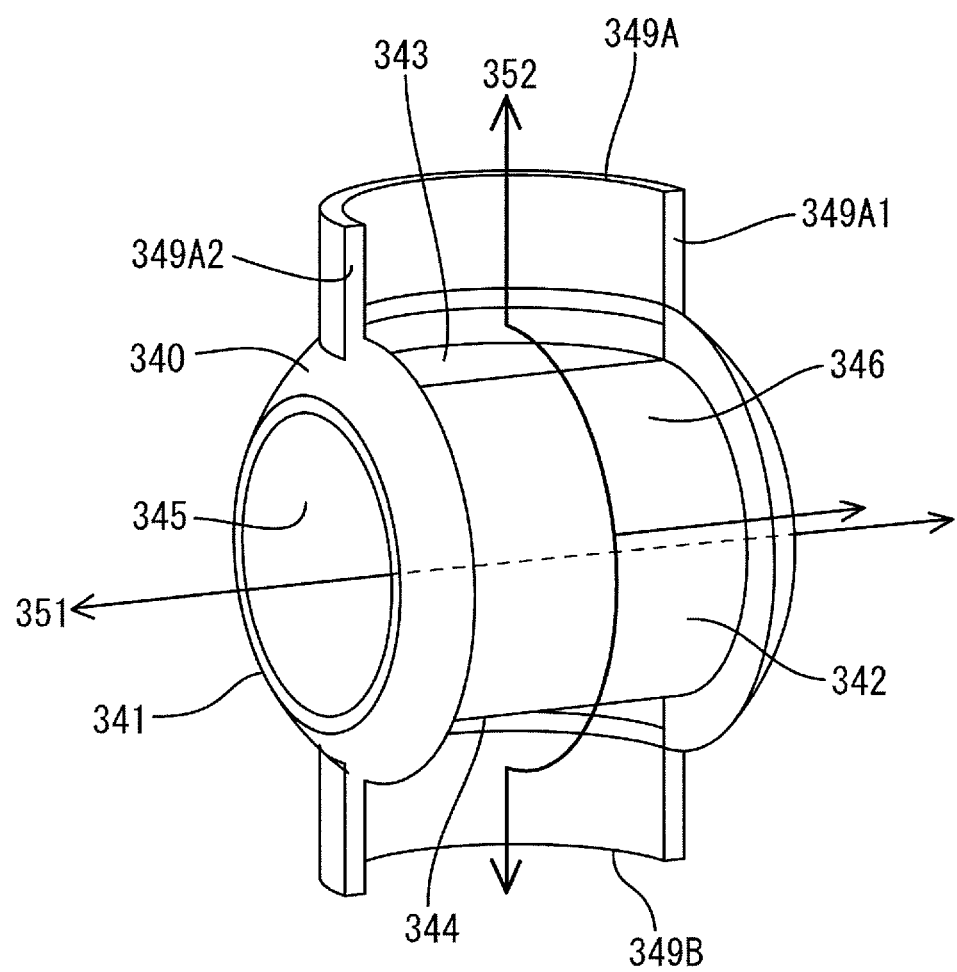
FIG. 14 is a perspective view depicting a ball valve according to a second embodiment.

As depicted in FIG. 14, a ball valve 340 according to a second embodiment has a through hole 345 penetrating through the inside of the ball valve 340 and a communicating groove 346 formed in a lateral wall of the ball valve 340. The communicating groove 346, which is different from the one employed in the first embodiment, is formed by partially hollowing out the sidewall of the ball valve 340 so as to extend from a third sidewall 343 to a fourth sidewall 344 via the second sidewall 342.

Figure 15:
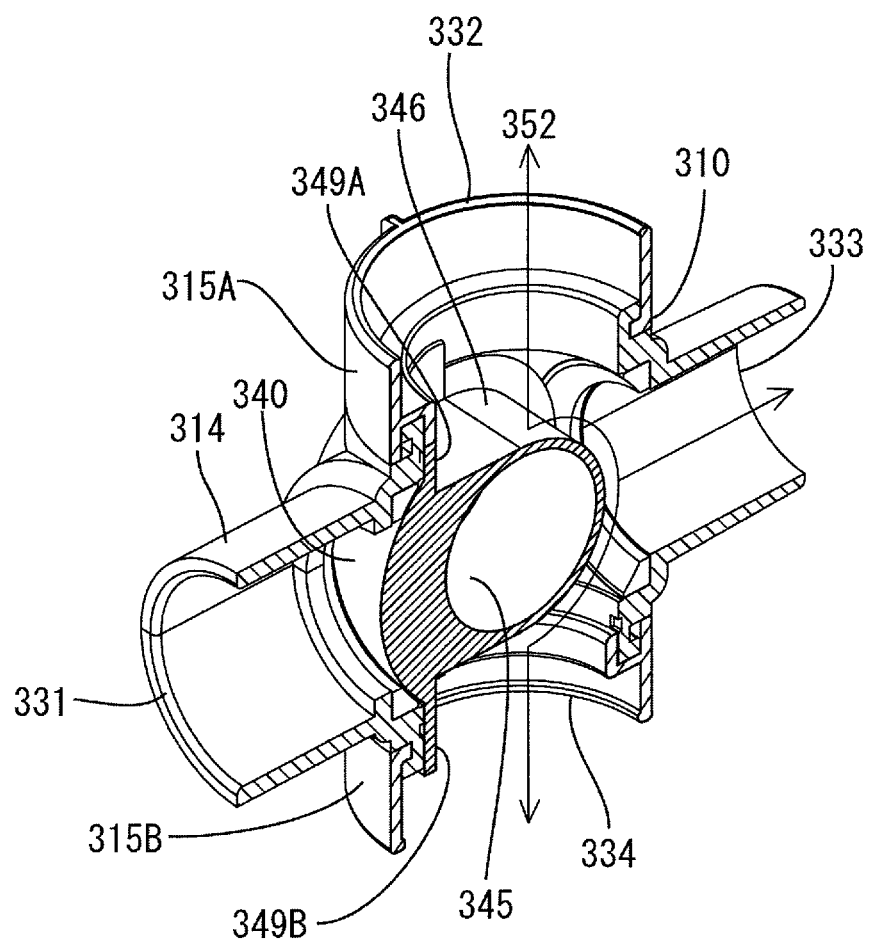
FIG. 15 is a perspective cross sectional view depicting a hose coupling device according to which the ball valve is disposed in a valve box in the second embodiment.

As depicted in FIG. 15, a hose coupling device 310 of this embodiment in which the ball valve 340 is disposed within a valve box is configured such that two branch pipes (hereinafter respectively referred to as the first branch pipe 315A and the second branch pipe 315B) branch from the lateral sides of a connecting pipe 314. The first branch pipe 315A and the second branch pipe 315B share the same axis and extend from the connecting pipe 314 so as to be perpendicular to the axis of the connecting pipe 314. The ball valve 340 is disposed in a posture where the third sidewall 343 faces the first branch pipe 315A while the fourth sidewall 344 faces the second branch pipe 315B.

In the hose coupling device 310, an opening at the distal end of the first branch pipe 315A serves as a second inlet 332 while an opening at the distal end of the second branch pipe 315B serves as a third inlet 334. In this embodiment, a second communicating channel 352 that extends from the second inlet 332 and the third inlet 334 to an outlet 333 via the communicating groove 346.

As depicted in FIGS. 14 and 15, the ball valve 340 according to this embodiment has a first ball valve rib 349A that extends from a portion facing the first branch pipe 315A (i.e., a portion of the third sidewall 343) in the axial direction of the first branch pipe 315A. Likewise, a second ball valve rib 349B extends from a portion facing the second branch pipe 315B (i.e., a portion of the fourth sidewall 344). The first ball valve rib 349A and the second ball valve rib 349B are formed along the periphery of the communicating groove 346 so as to have substantially semicircular shapes in a top view.

Figure 16:
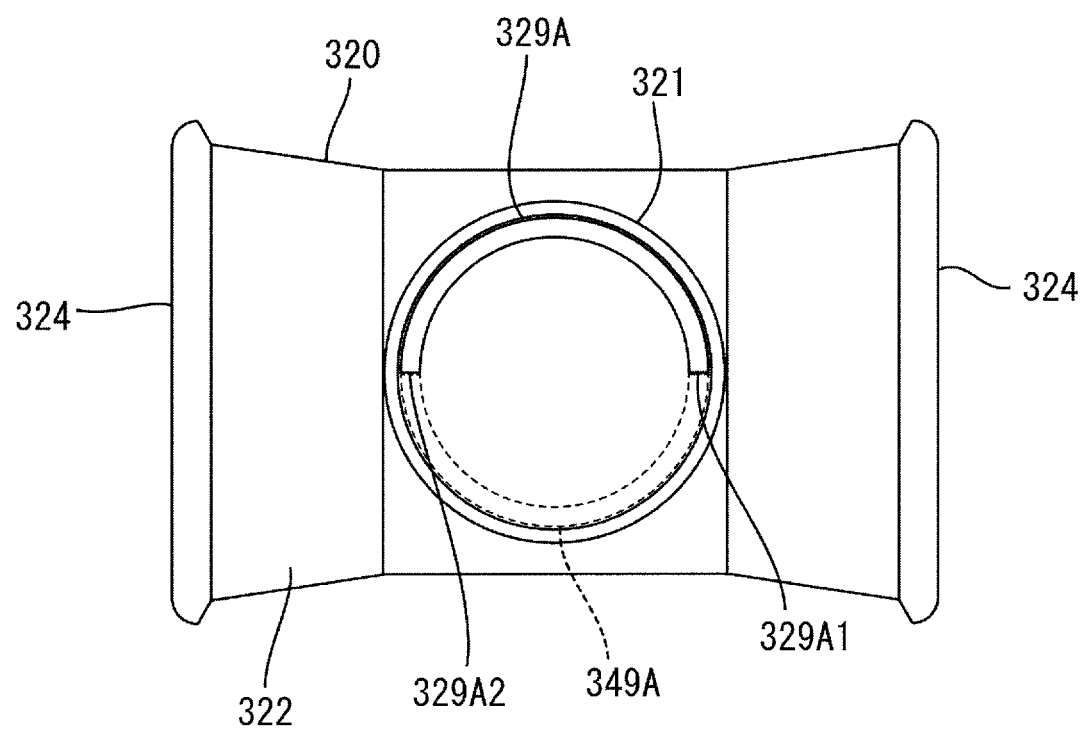
FIG. 16 is a top view depicting a mop suction device according to the second embodiment seen from a connecting pipe.

As depicted in FIG. 16, the mop suction device 320 coupled to at least either one of the first branch pipe 315A and the second branch pipe 315B has a connecting pipe rib 329A that extends from an edge periphery of the opening of the connecting pipe 321 in the axial direction of the first branch pipe 315A and the second branch pipe 315B when coupled to the hose coupling device 310.

When the mop suction device 320 is attached to the hose coupling device 310 such that the axis of the cleaning portion 322 of the mop suction device 320 becomes substantially in parallel to the axis of the connecting pipe 314 of the hose coupling device 310, a first end 349A1 of the first ball valve rib 349A approaches a first end 329A1 of the connecting pipe rib 329A in the direction about the axis of the first branch pipe 315A and the connecting pipe 321, as depicted in FIG. 16. In addition, a second end 349A1 of the first ball valve rib 349A approaches a second end 329A2 of the connecting pipe rib 329A in the direction about the axis of the first branch pipe 315A and the connecting pipe 321.

When the mop suction device 320 rotates about the axis of the first branch pipe 315A in the state where the above approaches have been made, the first end 349A1 or the second end 349A2 of the first ball valve rib 349A is pressed in the direction about the axis of the first branch pipe 315A by the first end 329A1 or the second end 329A2 of the connecting pipe rib 329A, such that the first ball valve rib 349A rotates in the direction about the axis of the first branch pipe 315A. In other words, in this embodiment, the first ball valve rib 349A and the connecting pipe rib 329A serve as the rotating mechanism rotating the ball valve 340.

According to the hose coupling device 310 of this embodiment, by rotating the mop suction device 320 in the direction about the axis of the first branch pipe 315A, the connecting pipe rib 329 of the mop suction device 320 presses the ball valve rib 349A in the direction about the axis of the first branch pipe 315A, and the ball valve 340 rotates in the direction about the axis of the first branch pipe 315A. According to this embodiment, the intake air and the like flowing through the communicating groove 346 smoothly flows within the communicating groove 346 without being impeded by obstacles, and thus a more favorable suction power is secured in the second communicating state.

Modification of Second Embodiment

Figure 17:
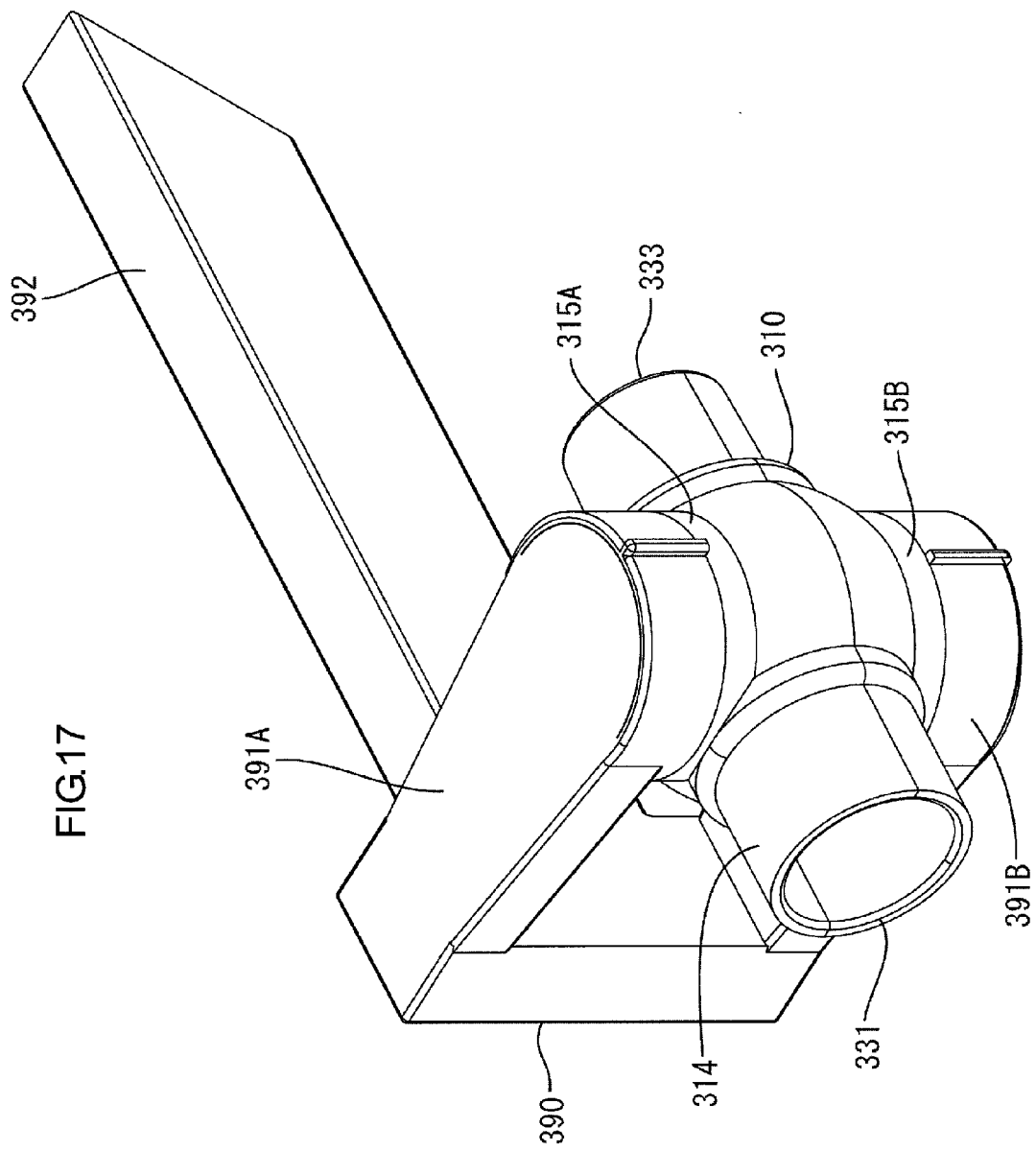
FIG. 17 is a perspective view depicting a hose coupling device attached with a crevice nozzle, according to a modification of the second embodiment.
Figure 18:
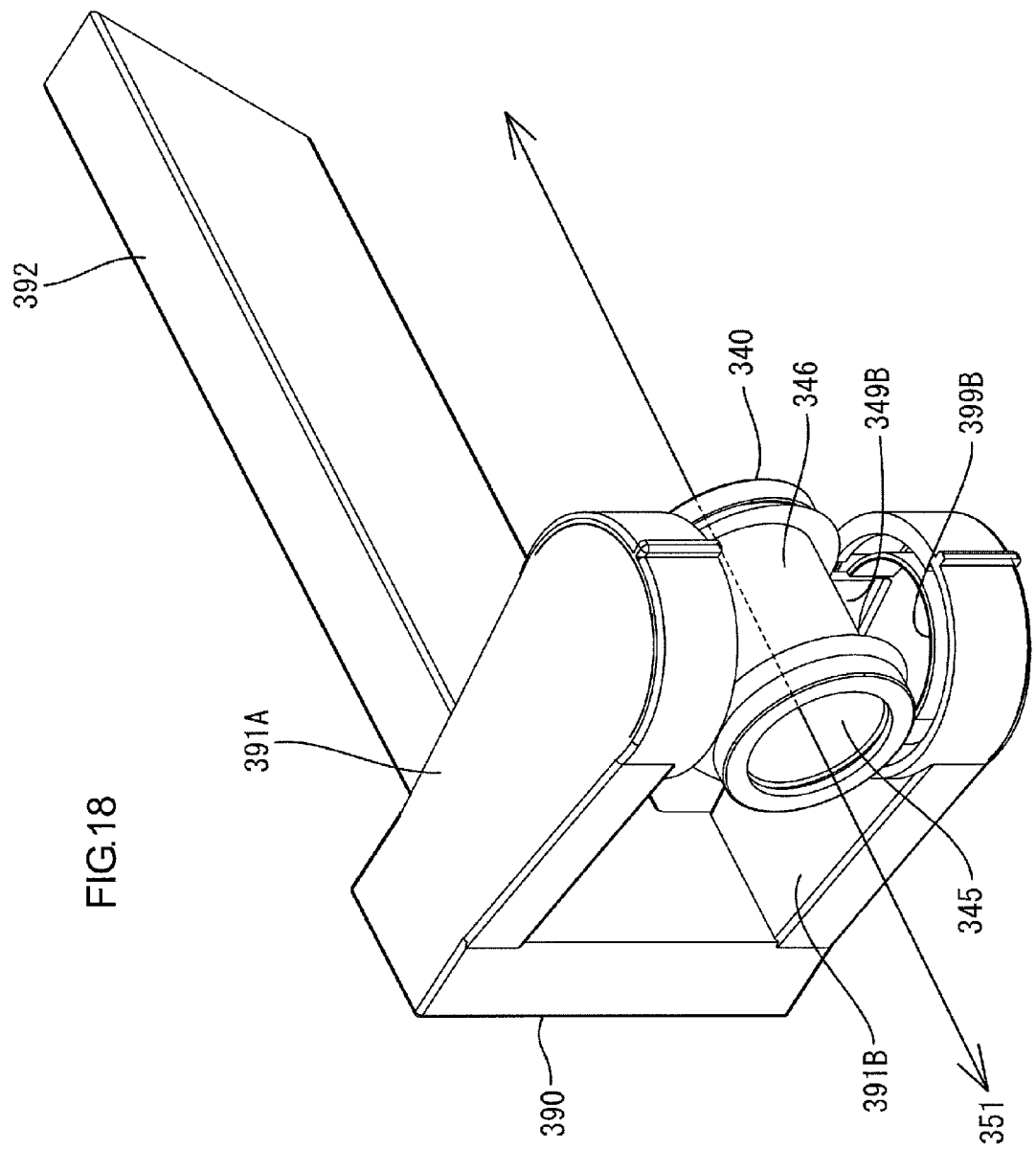
FIG. 18 is a perspective view depicting, in the hose coupling device attached with the crevice nozzle, only the ball valve, according to the modification of the second embodiment.

As depicted in FIG. 17, this modification exemplifies a configuration where the hose coupling device 310 is coupled with a crevice nozzle 390. As depicted in FIGS. 17 and 18, the crevice nozzle 390 includes a first coupling portion 391A, a second coupling portion 391B and a nozzle 392. The first coupling portion 391A and the second coupling portion 391B are coupled respectively to the first branch pipe 315A and the second branch pipe 315B of the hose coupling device 310. The nozzle 392 communicates with the first coupling portion 391A and with the second coupling portion 391B, and the distal end thereof is formed as an intake for suctioning the dusts and the like. The first coupling portion 391A and the second coupling portion 391B are each provided with a nozzle rib 399B.

By coupling the crevice nozzle 390 as configured above to the hose coupling device 310, in the second communicating state, the dusts and the like suctioned through the nozzle 392 are further suctioned to the outlet 333 through both of the first branch pipe 315A and the second branch pipe 315B of the hose linking instrument 310 at the same time. By separating the suctioning channel for suctioning the dusts and the like into the first branch pipe 315A and the second branch pipe 315B, even if, for instance, one of the suctioning channels is closed, the other one of the suctioning channels continues the operation of suctioning the dusts and the like.

Third Embodiment

Figure 19:
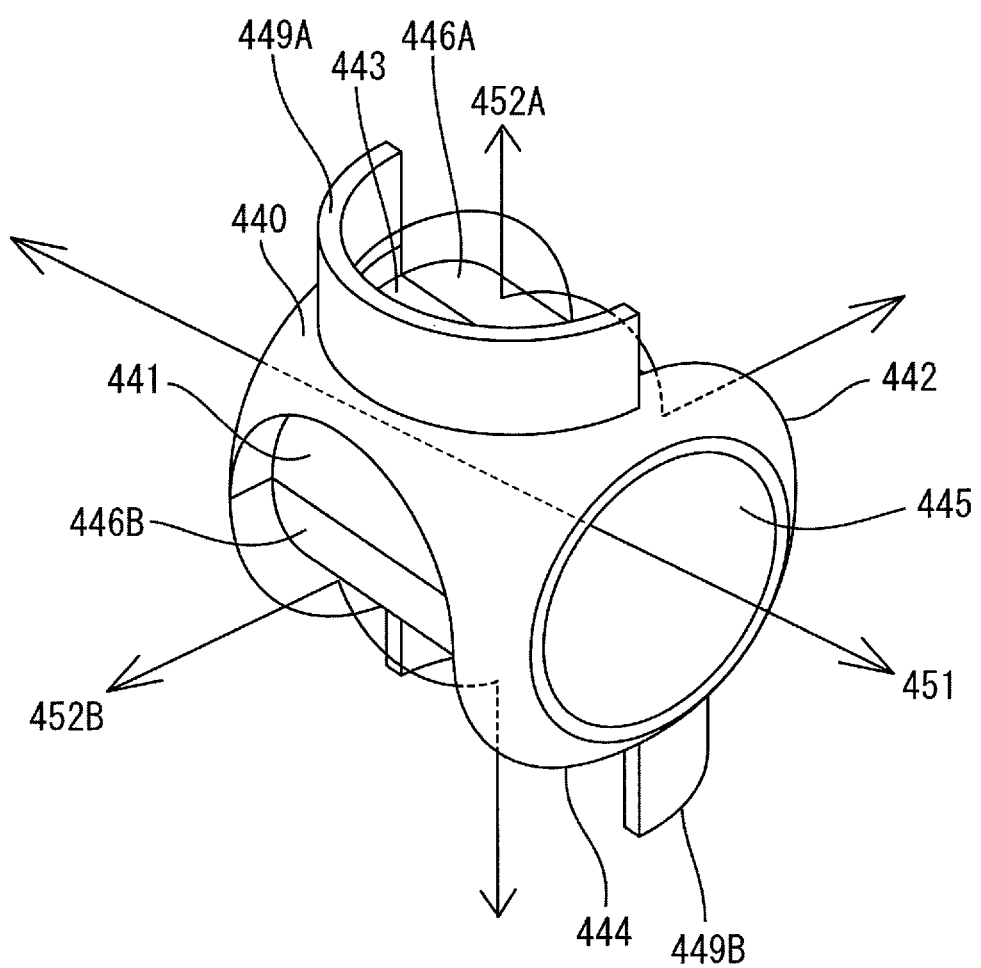
FIG. 19 is a perspective view depicting a ball valve according to a third embodiment.

As depicted in FIG. 19, a ball valve 440 according to a third embodiment has a through hole 445 penetrating through the inside of the ball valve 440 and two communicating grooves provided at a lateral surface of the ball valve 440 (hereinafter respectively referred to as the first communicating groove 446A and the second communicating groove 446B). The first communicating groove 446A is provided to the ball valve 440 while partially hollowing out the sidewall of the ball valve 440, through which the third sidewall 443 and the second sidewall 442 are in communication with each other. The second communicating groove 446B is provided to the ball valve 440 while partially hollowing out the sidewall of the ball valve 440, through which the first sidewall 441 and the fourth sidewall 444 are in communication with each other. The first communicating groove 446A and the second communicating groove 446B are separated from each other by the inner wall and the through hole 445 of the ball valve 440, and formed independently of each other.

Figure 20:
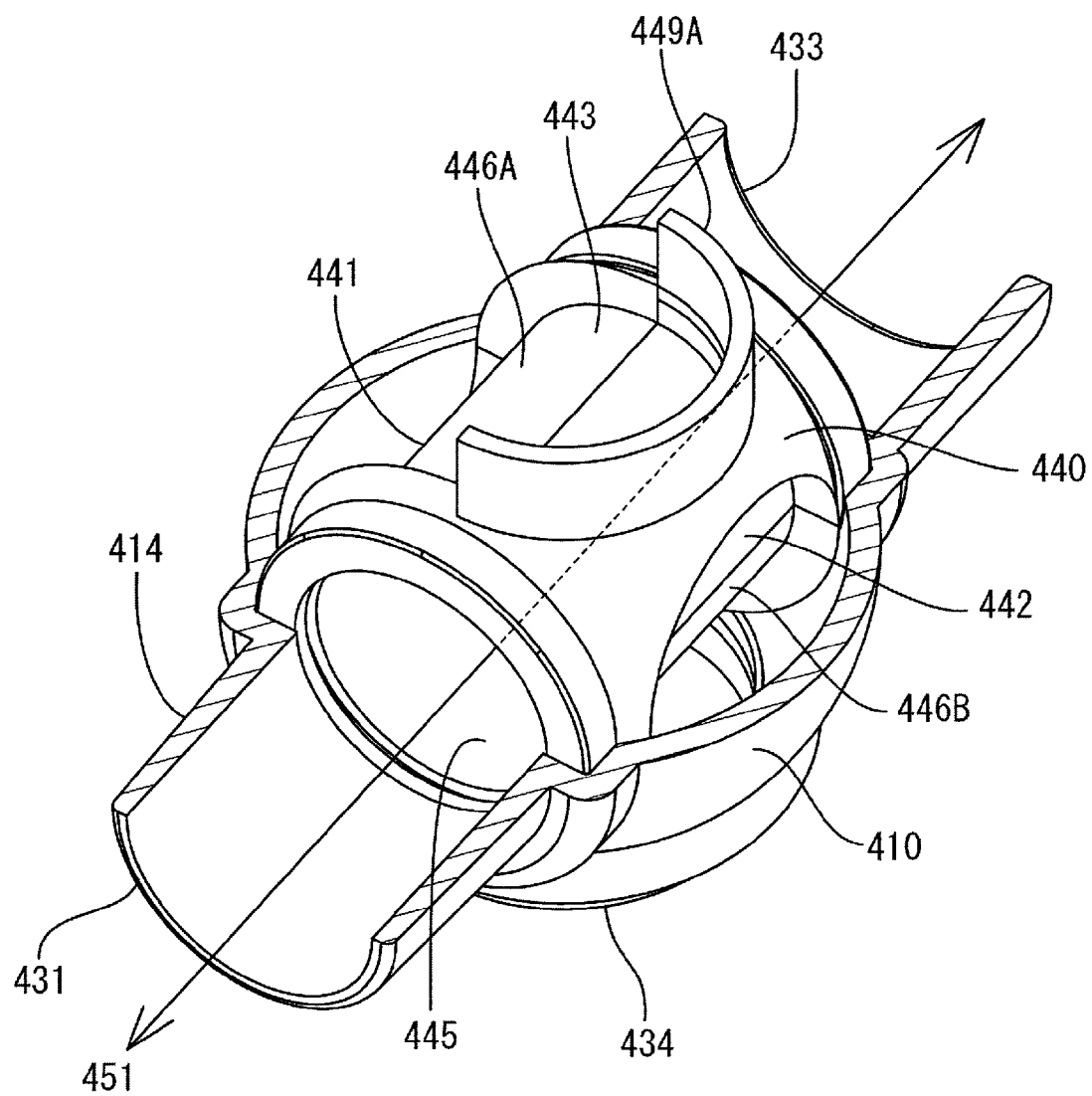
FIG. 20 is a perspective cross sectional view depicting a hose coupling device in which the ball valve is disposed in a valve box according to the third embodiment.

According to this embodiment, in the second communicating state obtained by rotating the ball valve 440 clockwise by substantially 90 degrees about the axis of the first branch pipe 415A as depicted in FIG. 20, a first communicating channel 446A is formed through which the second inlet 432, the first communicating groove 446A and an outlet 433 are in communication with one another, and also a second communicating channel 446B is formed through which the first inlet, the second communicating groove 446B and the third inlet 434 are in communication with one another.

On the other hand, in the second communicating state obtained by rotating the ball valve 440 counterclockwise by substantially 90 degrees about the axis of the first branch pipe 415A as depicted in FIG. 20, a first communicating channel 446A is formed through which the second inlet 432, the first communicating groove 446A and the first inlet 431 are in communication with one another, and also a second communicating channel is formed through which the third inlet 434, the second communicating groove 446B and the outlet 433 are in communication with one another.

Modification of Third Embodiment

Figure 21:
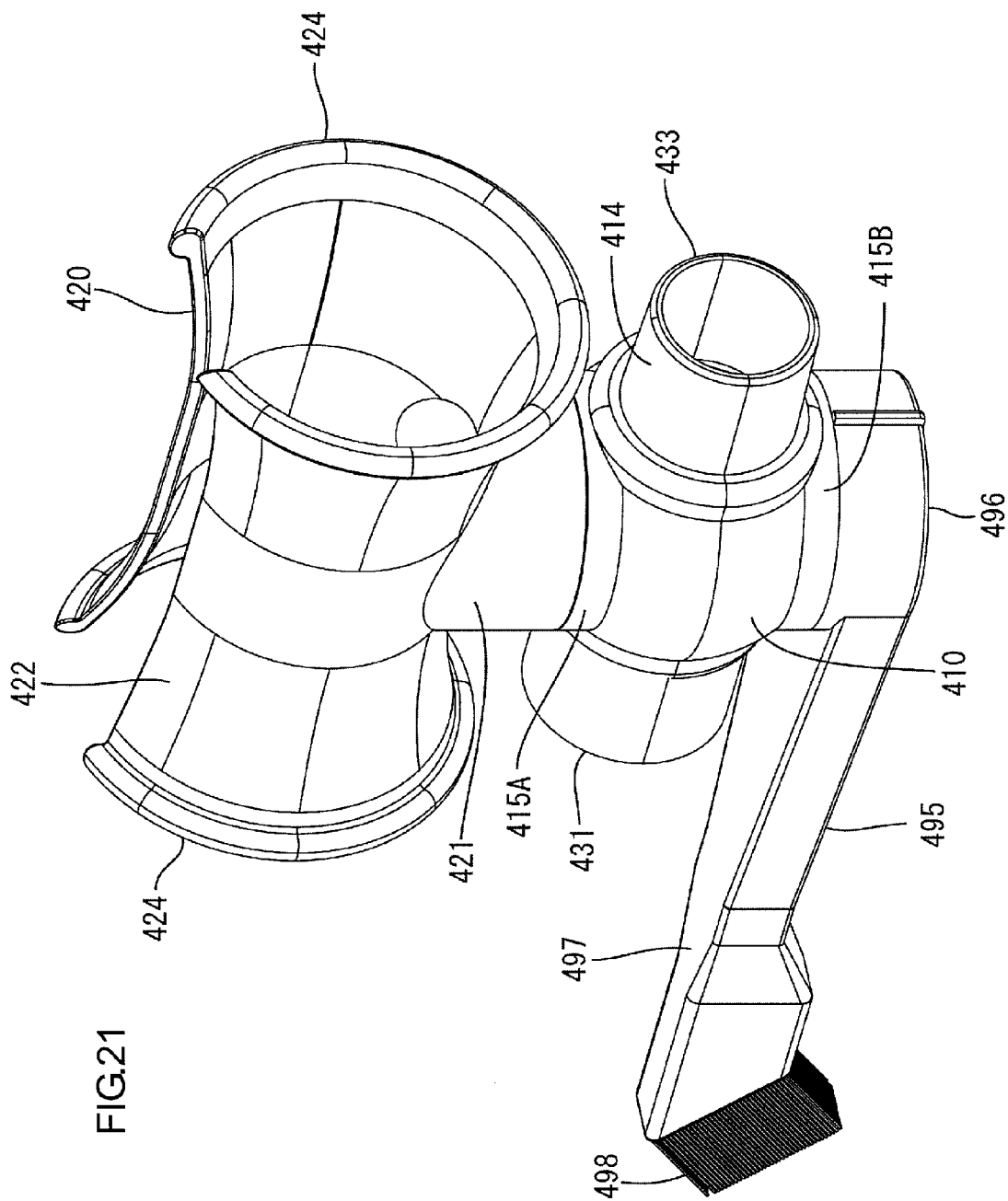
FIG. 21 is a perspective view depicting a hose coupling device attached with a brush nozzle, according to a modification of the third embodiment.
Figure 22:
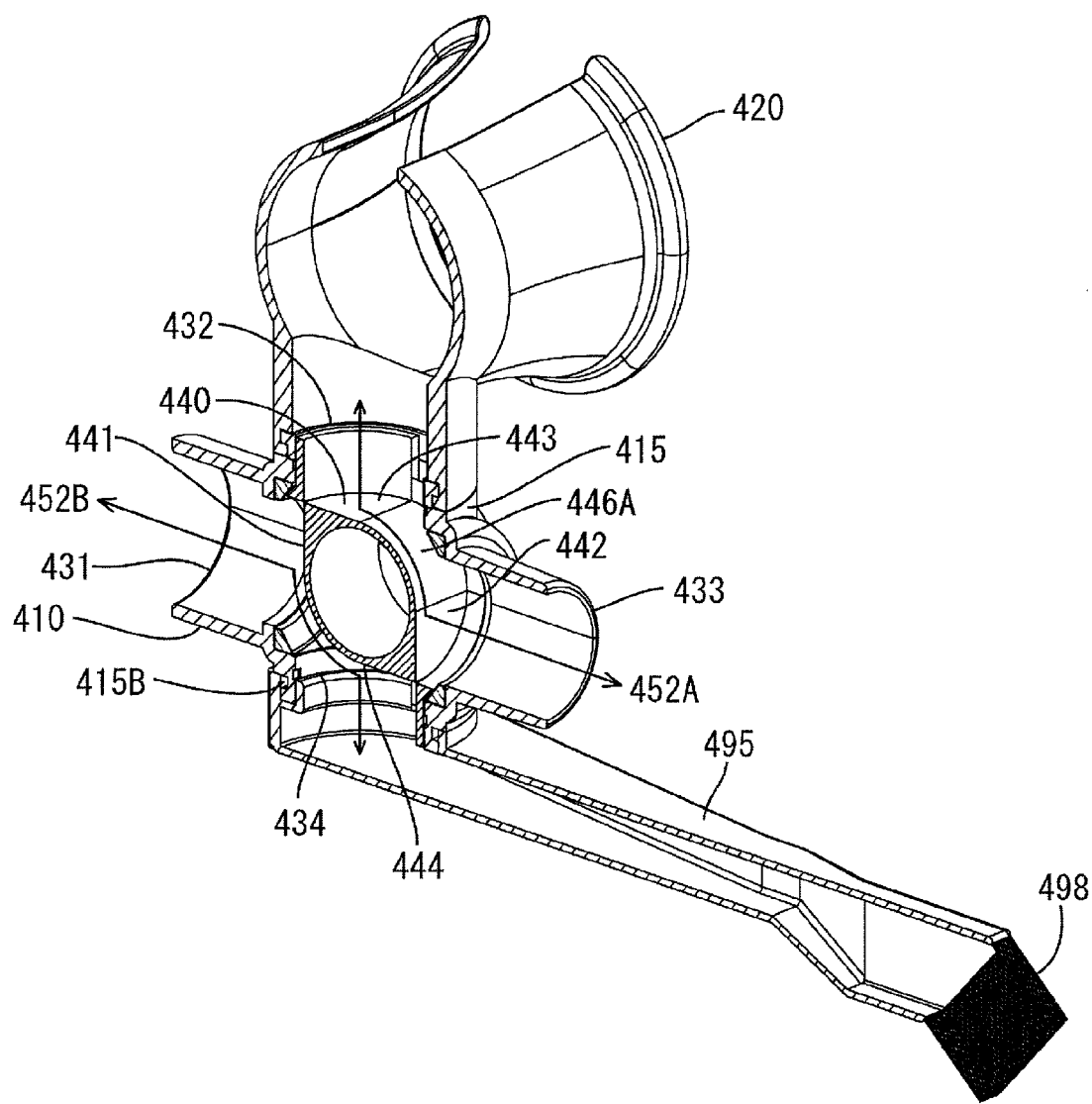
FIG. 22 is a perspective cross sectional view depicting the hose coupling device attached with the brush nozzle, according to the modification of the third embodiment.

As depicted in FIG. 21, according to this modification, the mop suction device 420 is coupled to the first branch pipe 415A of the hose coupling device 410 while a nozzle brush 495 is coupled to the second branch pipe 415B of the hose coupling device 410. As depicted in FIGS. 21 and 22, the nozzle brush 495 includes a brush mounting portion 496, a brush communicating portion 497 and a brush 498.

Figure 23:
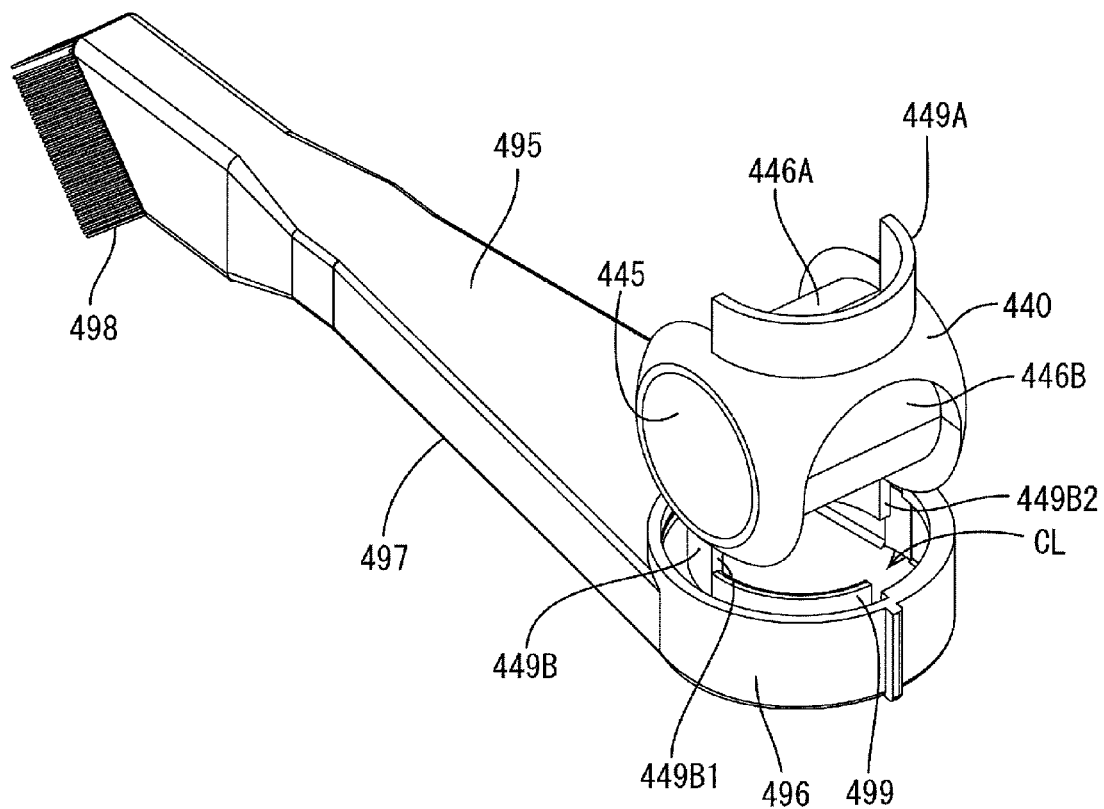
FIG. 23 is a perspective view depicting a rotating mechanism of the hose coupling device attached with the brush nozzle, according to the modification of the third embodiment.

Further, as depicted in FIG. 23, the inside of the brush mounting portion 496 is provided with a brush rib 499 extending in the axial direction of the second branch pipe 415B. The brush rib 499 has an arc shape in a top view, and such arc corresponds to approximately one fourth of the circumference in terms of the length. Therefore, as depicted in FIG. 23, when the brush rib 499 is positioned closer to the fourth sidewall 444 of the ball valve 440 such that the brush rib 499 approaches a first end 449B1 of a second ball valve rib 449B, a clearance CL having the length of one fourth of the circumference is formed between the brush rib 499 and a second end 449B2 of the second ball valve rib 449B.

When the nozzle brush 495 as depicted in FIG. 23 rotates counterclockwise by substantially 90 degrees, the brush rib 499 does not push the second ball valve rib 499B due to the clearance CL. Thus, the nozzle brush 495 is raced, and only the nozzle brush 495 rotates counterclockwise by substantially 90 degrees. On the other hand, when the nozzle brush 495 as depicted in FIG. 23 rotates by substantially 90 degrees clockwise, the brush rib 499 presses the second ball valve rib 449B having approached the first end of the brush rib 499, such that the nozzle brush 495 and the ball valve 440 are rotated clockwise by substantially 90 degrees.

The orientation of the ball valve 440 as depicted in FIG. 23 coincides with the orientation of the ball valve 440 during the second communicating state. In this modification, by rotating the nozzle brush 495 counterclockwise by substantially 90 degrees as described above and as depicted in FIG. 25, only the nozzle brush 495 rotates by substantially 90 degrees while maintaining the second communicating state. On the other hand, by rotating the nozzle brush 495 clockwise by substantially 90 degrees as described above and as depicted in FIG. 23, the nozzle brush 495 and the ball valve 440 are rotated by substantially 90 degrees, and the communicating state is switched from the second communicating state to the first communicating state.

Modifications of each embodiment described above will be described below.

(1) While each of the above embodiments exemplifies the mop suction device where the cover is fixed to either one end of the slit, the fixation of the cover to the cleaning portion is not limited to such configuration. Further, the material for the cover is not limited, either.

(2) While each of the above embodiments exemplifies the hose coupling device to which the mop suction device is coupled, the members coupled to the hose coupling device are not limited to the mop suction device. For instance, the members such as the crevice nozzle and the brush nozzle may be coupled to the hose coupling device. With such configuration, the convenience in the suction operation by the nozzle is prominently enhanced.

(3) While the second embodiment and the third embodiment exemplify the configuration where the first end of at least either one of the first ball valve rib and the second ball valve rib is positioned in the vicinity of the connecting pipe rib or the brush rib, the first end of at least either one of the first ball valve rib and the second ball valve rib may be in contact with the connecting pipe rib or the brush rib.

(4) The shapes, the configurations and the like of the connecting pipe and the branch pipe(s) of the hose coupling device may be suitably modified from those employed in each of the above embodiments.

(5) The size, the shape and the like of the through hole provided to the ball valve may be suitably modified from those employed in each of the above embodiments.

(6) The position, the shape and the like of the communicating groove provided to the ball valve may be suitably modified from those employed in each of the above embodiments.

(7) The positions, the shapes and the like of the ribs provided to the ball valve or of the ribs provided to a coupling device coupled to the hose coupling device may be suitably modified from those employed in the second and third embodiments.

INDUSTRIAL APPLICABILITY

The hose coupling device having the ball valve as exemplified in each embodiment is applicable in the various industries for use in branching the pipes not only for air but also for water, gas, chemical substances and the like, as well as for other uses. In addition, the mop suction device as exemplified in each embodiment, which prominently enhances the operability and the suction power of the dusts and the like as compared to a known technique, is applicable not only in home or clean rooms, but also for cleaning the sections narrow and vulnerable to impacts such as medical equipment in hospitals and detailed sections in vehicles. Further, by providing an ultraviolet irradiating function to the abutment portion of the mop fibers of the mop suction device, the mop fibers are sterilizable, and the mop is continuously usable while being kept cleaner.

The aspect of the invention may be described in the form of the concepts each described below.

(Concept 1)

A communicating portion of a hose, including: a connecting pipe that is hollow and open at both ends thereof; a branch pipe branched from a lateral surface of the connecting pipe; a valve box positioned at a position where a first inlet, an outlet and a second inlet are merged together, the first inlet being provided by a first opening of the connecting pipe, the outlet being provided by a second opening of the connecting pipe that directly leads to the first opening of the connecting pipe, the second inlet being provided to the branch pipe; and a ball valve having a substantially spherical shape and disposed within the valve box in contact with an inner wall of the valve box, in which the ball valve is attached to a rotary shaft whose axis extends through the center of the branch pipe, the ball valve includes: a through hole through which the first inlet and the outlet are in communication with each other; and a first sidewall facing the first inlet, a second sidewall facing the outlet, and a third sidewall positioned closer to the branch pipe in a state where the through hole rotates about the axis of the connecting pipe by 90 degrees, the third sidewall and the second sidewall are in communication with each other by a communicating groove, and an adjusting mechanism switches a suction channel between a first suction channel that directly flows and a second suction channel that merges with the first suction channel perpendicularly to the first suction channel, and adjusts flow rates of the first suction channel and the second suction channel.

(Concept 2)

A suction device for dusts of a mop, including a tubular cleaning portion having a connecting pipe, the connecting pipe of the tubular cleaning portion being rotatably coupled to the branch pipe provided to a connector of the hose, in which a rotation center of the connecting pipe of the tubular cleaning portion is attached with the rotary shaft of the ball valve of the connector of the hose, the tubular cleaning portion rotates, and an adjusting mechanism switches the suction channel between the first suction channel and the second channel, and adjusts flow rates of the first suction channel and the second suction channel.

(Concept 3)

A suction device for dusts of a mop, in which inner peripheral ends of opening portions at both ends of a substantially tubular peripheral wall of the tubular cleaning portion are widened outward, and the inner peripheral ends have curved portions that extend toward the center of the peripheral wall.

(Concept 4)

A suction device for dusts of a mop, including a slit provided to a lateral surface of the peripheral wall of the tubular cleaning portion and communicating with the opening portions of the peripheral wall, in which a flexible cover is fixed to either one end of the slit to cover the slit.

(Concept 5)

A mop, including: a grip made of a flexible material; a protrusion provided to a lateral surface of the grip and extending from the lateral surface of the grip of the mop in a direction opposite to a grip portion of the grip of the mop by a predetermined amount while maintaining a separation space; and a locking nail extending toward the lateral surface of the grip of the mop to close the separation space, a distal end of the nail approaching or being in contact with a lateral surface of the mop.

(Concept 6)

An electric vacuum cleaner, including an attaching mechanism attaching the suction device for dusts of a mop.

EXPLANATION OF SYMBOLS

1 . . . electric vacuum cleaner
5 . . . hose
8 . . . hose connector
10, 310, 410 . . . hose coupling device
14, 314, 414 . . . connecting pipe
15 . . . branch pipe
20, 320, 420 . . . mop suction device
21 . . . connecting pipe
22, 322, 422 . . . cleaning portion
31, 331, 431 . . . first inlet
32, 332, 432 . . . second inlet
33, 333, 433 . . . outlet
40, 340, 440 . . . ball valve
41, 341, 441 . . . first sidewall
42, 342, 442 . . . second sidewall
43, 343, 443 . . . third sidewall
44, 344, 444 . . . fourth sidewall
45, 345, 445 . . . through hole
46, 346 . . . communicating groove
51, 351 . . . first communicating channel
52, 352 . . . second communicating channel
70 . . . suction device rotary valve
80 . . . coupling device rotary valve
315A, 415A . . . first branch pipe
315B, 415B . . . second branch pipe
329A . . . connecting pipe rib
334, 434 . . . third inlet
349A, 449A . . . first ball valve rib
349B, 449B . . . second ball valve rib
390 . . . crevice nozzle
391A . . . first coupling portion
391B . . . second coupling portion
399B . . . nozzle rib
392 . . . nozzle
446A . . . first communicating groove
446B . . . second communicating groove
495 . . . nozzle brush
496 . . . brush mounting portion
497 . . . brush coupling portion
498 . . . brush
499 . . . brush rib

The invention claimed is:

1. A rotary valve of a pipe device including a first pipe, a second pipe, a first branch pipe, and a second branch pipe, the first pipe and the second pipe extending in a first direction, the first branch pipe and the second branch pipe extending in a second direction that is perpendicular to the first direction, the rotary valve being disposed at an intersection of the first pipe, the second pipe, the first branch pipe, and the second branch pipe, the rotary valve comprising:
   a spherical portion including:
      a through hole running through the spherical portion in the first direction;
      a first communicating groove defined in a first hemisphere surface of the spherical portion, the first communicating groove extending from a section of the first hemisphere surface facing an opening of the first branch pipe toward the second branch pipe to communicate with the first branch pipe but not with the second branch pipe;
      a second communicating groove defined in a second hemisphere surface of the spherical portion, the second communicating groove extending from a section of the second hemisphere surface facing an opening of the second branch pipe toward the first branch pipe to communicate with the second branch pipe but not with the first branch pipe; and
   a rotary mechanism that rotates the spherical portion about an axis of the spherical portion parallel to the second direction such that the first communicating groove communicates with the first pipe and the second communicating groove communicates with the second pipe.

2. The rotary valve according to claim 1, wherein the rotary mechanism includes protrusions protruding in the second direction respectively from the first hemisphere surface and the second hemisphere surface.

3. The rotary valve according to claim 2, wherein the protrusions are disposed in the first branch pipe and the second branch pipe respectively along inner walls of the first branch pipe and the second branch pipe.

* * * * *